United States Patent [10] Patent No.: US 12,498,319 B2
Kim et al. (45) Date of Patent: Dec. 16, 2025

(54) MATCHED OPTICAL FILTER

(71) Applicant: RedShift BioAnalytics, Inc., Burlington, MA (US)

(72) Inventors: Jinhong Kim, Burlington, MA (US); Dennis Merrill, Burlington, MA (US)

(73) Assignee: RedShift BioAnalytics, Inc., Boxborough, MA (US)

( * ) Notice: Subject to any disclaimer, the term of this patent is extended or adjusted under 35 U.S.C. 154(b) by 249 days.

(21) Appl. No.: 18/196,946

(22) Filed: May 12, 2023

(65) Prior Publication Data

US 2024/0377319 A1    Nov. 14, 2024

(51) Int. Cl.
*G01N 21/3577* (2014.01)
*G01N 21/01* (2006.01)
*G01N 33/18* (2006.01)

(52) U.S. Cl.
CPC ......... *G01N 21/3577* (2013.01); *G01N 21/01* (2013.01); *G01N 33/18* (2013.01); *G01N 2201/06113* (2013.01)

(58) Field of Classification Search
CPC .... G01N 21/3577; G01N 21/01; G01N 33/18; G01N 2201/06113
See application file for complete search history.

(56) References Cited

U.S. PATENT DOCUMENTS

| | | | |
|---|---|---|---|
| 3,381,134 A | 4/1968 | Wolf | |
| 4,856,321 A | 8/1989 | Smalling et al. | |
| 4,862,475 A | 8/1989 | Deki | |
| 4,999,513 A | 3/1991 | Ito et al. | |

(Continued)

FOREIGN PATENT DOCUMENTS

| | | |
|---|---|---|
| CN | 102713578 A | 10/2012 |
| EP | 0625811 A1 | 11/1994 |

(Continued)

OTHER PUBLICATIONS

BioCision, "Thermo-conductive microplate, tissue culture plate and reservoir modules", 2017.

(Continued)

*Primary Examiner* — David P Porta
*Assistant Examiner* — Fani Polyzos Boosalis
(74) *Attorney, Agent, or Firm* — Nutter McClennen & Fish LLP

(57) ABSTRACT

In illustrative embodiments, matched optical filters, and methods and systems for using matched optical filters for acquiring infra-red transmission spectra of liquid analytes in very highly absorbing reference solutions are disclosed herein. The matched optical filters compensate for the very high absorbance of the reference solution by filtering out at least a portion of coherent light from a tunable infra-red optical laser to a substantially inverse manner to the absorbance of the reference solution. The matched optical filter may be adjusted to compensate for differences in laser gain across a spectral region of interest where the differential transmission at each wavelength may vary by more than 150 times across the operating range. Thus, the matched optical filters make it possible to obtain spectra of the liquid analyte that may have several orders of magnitude lower absorbance than the reference solution.

40 Claims, 17 Drawing Sheets

(56) References Cited

U.S. PATENT DOCUMENTS

| | | |
|---|---|---|
| 5,306,641 A | 4/1994 | Saccocio |
| 5,381,010 A | 1/1995 | Gordon |
| 5,581,531 A | 12/1996 | Ito et al. |
| 5,628,961 A | 5/1997 | Davis et al. |
| 5,654,551 A | 8/1997 | Watt et al. |
| 5,661,558 A | 8/1997 | Nogami et al. |
| 5,741,463 A | 4/1998 | Sanadi |
| 5,819,842 A | 10/1998 | Potter et al. |
| 5,886,247 A | 3/1999 | Rabbett |
| 6,199,257 B1 | 3/2001 | Munk et al. |
| 6,205,159 B1 | 3/2001 | Sesko et al. |
| 6,285,504 B1 | 9/2001 | Diemeer |
| 6,292,756 B1 | 9/2001 | Lievois et al. |
| 6,340,589 B1 | 1/2002 | Turner et al. |
| 6,485,980 B1 | 11/2002 | Adolfsen et al. |
| 6,531,044 B1 | 3/2003 | Anazawa et al. |
| 6,611,319 B2 | 8/2003 | Wang |
| 6,658,031 B2 | 12/2003 | Tuganov et al. |
| 6,853,654 B2 | 2/2005 | McDonald et al. |
| 7,106,764 B1 | 9/2006 | Weingarten et al. |
| 7,120,176 B2 | 10/2006 | McDonald et al. |
| 7,257,142 B2 | 8/2007 | Sochava et al. |
| 7,295,582 B2 | 11/2007 | McDonald et al. |
| 7,647,092 B2 | 1/2010 | Motz et al. |
| 8,018,593 B2 | 9/2011 | Tan et al. |
| 8,502,148 B2 | 8/2013 | Wagner et al. |
| 8,941,062 B2 | 1/2015 | Wagner et al. |
| 8,942,267 B2 | 1/2015 | Ma et al. |
| 8,981,298 B2 | 3/2015 | Wagner et al. |
| 9,003,869 B2 | 4/2015 | Wagner et al. |
| 9,377,400 B2 | 6/2016 | Wagner et al. |
| 9,625,378 B2 | 4/2017 | Marshall et al. |
| 9,742,148 B2 | 8/2017 | Ma et al. |
| 9,778,167 B2 | 10/2017 | Wagner et al. |
| 9,921,157 B2 | 3/2018 | Rothberg et al. |
| 10,180,388 B2 | 1/2019 | Wagner |
| 10,180,389 B2 | 1/2019 | Wagner et al. |
| 10,190,969 B2 | 1/2019 | Marshall et al. |
| 10,348,053 B2 | 7/2019 | Ma et al. |
| 10,677,710 B2 | 6/2020 | Wagner |
| 10,720,754 B2 | 7/2020 | Ma et al. |
| 10,746,646 B2 | 8/2020 | Wagner et al. |
| 11,150,180 B1 | 10/2021 | Ma et al. |
| 11,169,084 B2 | 11/2021 | Marshall et al. |
| 11,209,349 B2 * | 12/2021 | Dalby .................. G01J 3/4406 |
| 11,283,236 B2 | 3/2022 | Ma et al. |
| 11,454,584 B2 | 9/2022 | Wagner et al. |
| 11,874,288 B1 | 1/2024 | Marshall et al. |
| 2002/0055187 A1 | 5/2002 | Treptow |
| 2003/0006140 A1 | 1/2003 | Vacca et al. |
| 2003/0007539 A1 | 1/2003 | Sell et al. |
| 2003/0012250 A1 | 1/2003 | Shirasaki |
| 2003/0022388 A1 | 1/2003 | Roos et al. |
| 2003/0041652 A1 | 3/2003 | Spaid et al. |
| 2003/0067948 A1 | 4/2003 | Tatsuno et al. |
| 2003/0086655 A1 | 5/2003 | Deacon |
| 2003/0123503 A1 | 7/2003 | Matsumoto et al. |
| 2003/0137661 A1 | 7/2003 | Ortyn et al. |
| 2003/0231666 A1 | 12/2003 | Daiber et al. |
| 2004/0066703 A1 | 4/2004 | Sparey-Taylor et al. |
| 2004/0076319 A1 | 4/2004 | Fauver et al. |
| 2004/0142484 A1 | 7/2004 | Berlin et al. |
| 2004/0145741 A1 | 7/2004 | Cole et al. |
| 2004/0190569 A1 | 9/2004 | Kang et al. |
| 2004/0258107 A1 | 12/2004 | Sherrer et al. |
| 2004/0259268 A1 | 12/2004 | Jacobs et al. |
| 2005/0157770 A1 | 7/2005 | Behfar et al. |
| 2006/0106557 A1 | 5/2006 | Fontaine et al. |
| 2006/0215713 A1 | 9/2006 | Flanders et al. |
| 2007/0044572 A1 | 3/2007 | Davis et al. |
| 2007/0133647 A1 | 6/2007 | Daiber |
| 2007/0202538 A1 | 8/2007 | Glezer et al. |
| 2007/0267575 A1 | 11/2007 | Holly et al. |
| 2007/0278408 A1 | 12/2007 | Johansen |
| 2008/0014575 A1 | 1/2008 | Nelson |
| 2008/0026483 A1 | 1/2008 | Oldenburg |
| 2009/0051901 A1 | 2/2009 | Shen et al. |
| 2010/0182605 A1 | 7/2010 | Stockwell et al. |
| 2010/0297707 A1 | 11/2010 | Lee et al. |
| 2011/0000796 A1 | 1/2011 | Situ et al. |
| 2011/0110388 A1 | 5/2011 | Baroni et al. |
| 2011/0183312 A1 | 7/2011 | Huang |
| 2011/0253224 A1 | 10/2011 | Linder et al. |
| 2012/0143087 A1 | 6/2012 | Ganor et al. |
| 2013/0110467 A1 | 5/2013 | Feller et al. |
| 2013/0210128 A1 | 8/2013 | Rothberg et al. |
| 2013/0242307 A1 | 9/2013 | Hanashi et al. |
| 2014/0049777 A1 | 2/2014 | Sun et al. |
| 2014/0190243 A1 | 7/2014 | Gunji |
| 2015/0096746 A1 | 4/2015 | DiFoggio et al. |
| 2015/0099274 A1 | 4/2015 | Axelrod et al. |
| 2015/0276589 A1 | 10/2015 | Wagner et al. |
| 2015/0276614 A1 | 10/2015 | Ditch et al. |
| 2017/0317470 A1 | 11/2017 | Ma et al. |
| 2018/0059005 A1 | 3/2018 | Marshall et al. |
| 2019/0056320 A1 | 2/2019 | Maleev et al. |
| 2019/0226983 A1 | 7/2019 | Marshall et al. |
| 2019/0326728 A1 | 10/2019 | Ma et al. |
| 2020/0319083 A1 | 10/2020 | Wagner |
| 2020/0350743 A1 | 11/2020 | Ma et al. |
| 2020/0371014 A1 | 11/2020 | Wagner et al. |

FOREIGN PATENT DOCUMENTS

| | | | |
|---|---|---|---|
| EP | 1793220 | A1 | 6/2007 |
| JP | H04504930 | A | 8/1992 |
| JP | H11307879 | A | 11/1999 |
| JP | 2003051633 | A | 2/2003 |
| JP | 2003152256 | A | 5/2003 |
| JP | 2006100415 | A | 4/2006 |
| JP | 2008544530 | A | 12/2008 |
| JP | 2009290206 | A | 12/2009 |
| TW | 200912278 | A | 3/2009 |
| WO | 9013161 | A1 | 11/1990 |
| WO | 99/36766 | A1 | 7/1999 |
| WO | 03005500 | A2 | 1/2003 |
| WO | 200563962 | A1 | 7/2005 |
| WO | 2007005700 | A1 | 1/2007 |
| WO | 2008133281 | A1 | 11/2008 |
| WO | 2016132222 | A2 | 8/2016 |

OTHER PUBLICATIONS

Chinese Patent Office, Chinese Office Action for Application No. 201910961927.4, dated Oct. 9, 2021, 17 pages.

International Search Report for International Application No. PCT/US2015/023324 mailed from the International Searching Authority on Jul. 13, 2015, 9 pages.

Thermo Fisher Scientific Inc., "Thermo Scientific Microplates Guide", 2014.

International Search Report and Written Opinion for International Application No. PCT/US2024/023314 mailed Jun. 17, 2024 (23 pages).

* cited by examiner

Dynamic range of detector voltage

MATCHED OPTICAL FILTER

FIELD

Illustrative embodiments of the invention generally relate to infra-red spectroscopy and, more particularly, various embodiments of the invention relate to filters that are optically matched to allow measurement of biological samples dispersed in strongly absorbing reference solutions.

BACKGROUND

Infra-red (IR) absorption spectroscopy is a powerful tool to analyze protein's secondary structures in aqueous solutions. However, the strong absorption of infrared energy in liquid water, particularly over the wavelength range where the most-desirable, Amide-I band is located (1580-1720 cm-1), made such measurements significantly harder. There are a couple of big challenges.

Due to the large IR absorption of water, which in turn significantly impacts the measurement system's signal-to-noise ratio (e.g., SNR), such measurements require a much brighter light source than conventional FTIR. Alternatives include but are not limited to instruments that have broadly tunable Quantum Cascade Laser (QCL) modules.

More importantly, liquid water's absorption coefficient varies greatly over the wavelength measurement region such that the liquid water layer's absorption characteristics are also highly nonlinear over the measurement wavelength range such that differential transmission at each wavelength varies by 150 times (e.g., 150×) across the operating range.

For this reason, each instrument typically incorporates a set of multiple flat response Neutral Density (ND) filters to utilize the full detector dynamic range yet provide enough bit resolution between attenuation levels. This often requires repeating tests multiple times, each with a fixed attenuation ND filter, which in turn results in at least a 3× longer test time and more test sample volume. For any instruments with high coherence light sources like lasers, strong optical interference between optical surfaces poses significant challenges in achieving the optimum data quality. Moreover, such optical interference varies when passing different components (e.g., various ND filters) and drift over time at different rates. Therefore, in addition to the data quality, combining test results that were taken with different ND filters (i.e. stitching) poses yet another unique challenge.

SUMMARY OF VARIOUS EMBODIMENTS

In accordance with one embodiment of the invention, a method to measure a liquid analyte with a weak absorbance in a prescribed reference solution with a very high absorbance includes alternatively flowing the liquid analyte and the prescribed reference solution through a fluid chamber in a liquid flow cell. The method further includes emitting an infra-red (IR) light from an IR light source. The method further includes using a matched optical filter, spectroscopically matched to at least a component portion of the prescribed reference solution to filter the IR light from the IR light source to produce filtered light. The matched optical filter is configured to filter at least a portion of the IR light from the IR light source in a substantially inverse manner to the absorbance of the prescribed reference solution. The matched optical filter transmits the filtered light through the fluid chamber to produce a chamber signal. The method further includes using a detector having an optical range to detect the chamber signal.

The chamber signal may include at least one of an analyte signal or a reference signal. The IR light emitted from the IR light source may include a coherent IR light from a tunable optical laser source. The tunable optical laser source may include tunable optical quantum cascade laser (QCL) configured to operate in an IR region.

The prescribed reference solution may include a portion of at least one component, the components comprising a reference fluid, a salt, and a buffer solution. The reference fluid component may include at least one of a water, an alcohol, or an oil. The reference fluid component may be water.

The method may further include providing a shutter. The shutter may be configured to be positioned in an optical beam path of the filtered light such that the filtered light is blocked from reaching the sample cell at predetermined intervals.

The matched optical filter may reduce the reference signal across a spectral region of interest to be maintained within a correctible linear range of the detector. The matched optical filter may be spectroscopically matched to between about 1600 cm-1 to about 1700 cm-1. The matched optical filter may be spectroscopically matched to between about 1580 cm-1 to about 1720 cm-1. The matched optical filter may be spectroscopically matched to between about 400 cm-1 to about 1200 cm-1. The matched optical filter may be spectroscopically matched to between about 3000 cm-1 to about 3700 cm-1. The detector is spectroscopically matched to the spectral region of interest from between about 1600 cm-1 to about 1700 cm-1.

The method may further include controlling the system with a controller that fully automates the liquid analyte and the reference solution handling. The method may further include controlling the system with a controller that fully automates measurement of the analyte signal and the reference signal. The controller may provide automatic and continuous real-time background referencing.

In accordance with another embodiment of the invention, a system to measure a liquid analyte with a weak absorbance in a prescribed reference solution with a very high absorbance includes a tunable optical laser source configured to emit coherent light across a range of wavelengths. The system further includes a liquid flow cell having a sample chamber with a chamber window configured to alternatively receive the liquid analyte and the prescribed reference solution. The system further includes a matched optical filter spectroscopically matched to the prescribed reference solution.

The matched optical filter is configured to substantially flatten the very high absorbance of a prescribed reference solution signal across at least a portion of an optical spectrum. The portion of the coherent light from the tunable optical laser is filtered in a substantially inverse manner to the absorbance of the prescribed reference solution.

The system may further include a detector configured so that the emitted coherent light may be directed toward the matched optical filter so that the emitted coherent light is filtered to pass a filtered light. The filtered light may be directed to pass through the chamber window in the sample chamber where it interacts with either the liquid analyte to produce a liquid analyte spectrum or the prescribed reference solution to produce a prescribed reference solution spectrum. The detector may be further configured to measure the liquid analyte spectrum or the reference solution spectrum.

The system may further include a controller in electrical communication with the system that fully automates the alternatively receiving the liquid analyte and the reference solution. Further, the controller may fully automate measurement of the liquid analyte spectrum and the reference solution spectrum.

The prescribed reference solution may include a liquid water layer having a thickness of between about 22+/−0.5 um and about 27+/−0.5 um.

The matched optical filter may be positioned in an optical path between a laser window and a detector window. The matched optical filter may be positioned in the optical path before the chamber window. The matched optical filter may be combined with one or more of a chamber window, a laser window, or a mirror.

The matched optical filter may include a substrate, and a plurality of layers deposited on the substrate that form an interference filter. The substrate may include at least one of a germanium (Ge) window; a calcium fluoride ($CaF_2$) window; a barium fluoride ($BaF_2$) window; a zinc selenide (ZnSe) window; a chalcogenide window; or a silicon (Si) window. The substrate may include a germanium (Ge) window. The substrate may have a wedged shape to reduce interference effects when used in transmission.

The matched optical filter may include an anti-reflection (AR) coating grown on the matched optical filter substrate on the opposite side of the plurality of layers. The AR coating may increase the transmittance of the filtered light by reducing internal reflection of the filtered light from of the inside surface of the matched optical filter substrate. AR coatings may be formed from stacks of transparent thin film structures with alternating layers of contrasting refractive index.

The matched optical filter may be adjusted to compensate for differences in laser gain across the spectral region of interest. The matched optical filter may be configured to provide compensation that is between the reference fluid and the sample fluid. The liquid analyte may include at least one of a protein, a nucleic acid, a lipid-like substance, or a virus.

The tunable optical laser source may include a quantum cascade laser (QCL). The QCL may emit a coherent light in a wavenumber range between 1580 cm-1 to 1720 cm-1. The QCL may operate with a resolution of 1 cm-1. The QCL may operate within an analyte concentration range of between about 0.1 mg/mL to 200 mg/mL. The QCL may operate with a high power output, the high power output being between about 5 mW and 200 mW.

The system may measure an infra-red (IR) absorbance spectrum of the liquid analyte. The system may measure an IR absorbance spectrum of the prescribed reference solution. A ratio of the IR absorbance spectrum of the liquid analyte to the IR absorbance spectrum of the prescribed reference solution is performed to produce a differential absorbance signal.

The alternately receiving of the liquid analyte and the prescribed reference solution in the sample chamber may occur at a rate of between about 0.1 cycles per second and 50 cycles per second without moving the sample cell.

In accordance with yet another embodiment of the invention, a matched optical filter for use with a prescribed reference solution includes a substrate, and a plurality of layers on the substrate that form an optical filter spectroscopically matched to the prescribed reference solution. The matched optical filter may be configured to compensate for a very high absorbance of a reference solution signal across a portion of an optical spectrum, the matched optical filter configured to filter at least a portion of coherent light from a tunable optical laser to a substantially inverse manner to the absorbance of the prescribed reference solution. The matched optical filter may flatten out an optical power of a liquid water layer absorption spectrum measured by a detector after the filtered light passes through a liquid water layer having a thickness of between about 22+/−um and about 27+/−um.

The matched optical filter may flatten out an optical power of a liquid water layer absorption spectrum measured by a detector after the filtered light passes through a liquid water layer having a thickness of between about 10 um and about 100 um.

The substrate may include at least one of a germanium (Ge) window; a calcium fluoride ($CaF_2$) window; a barium fluoride ($BaF_2$) window; a zinc selenide (ZnSe) window; a chalcogenide window; or a silicon (Si) window. The substrate may be germanium (Ge).

The matched optical filter may include an anti-reflection (AR) coating grown on a side of the substrate that is opposite of the side having the plurality of layers. The matched optical filter may include an optical bandpass filter. The matched optical filter may include a tailored bandpass filter. The matched optical filter may include a coated mirror.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
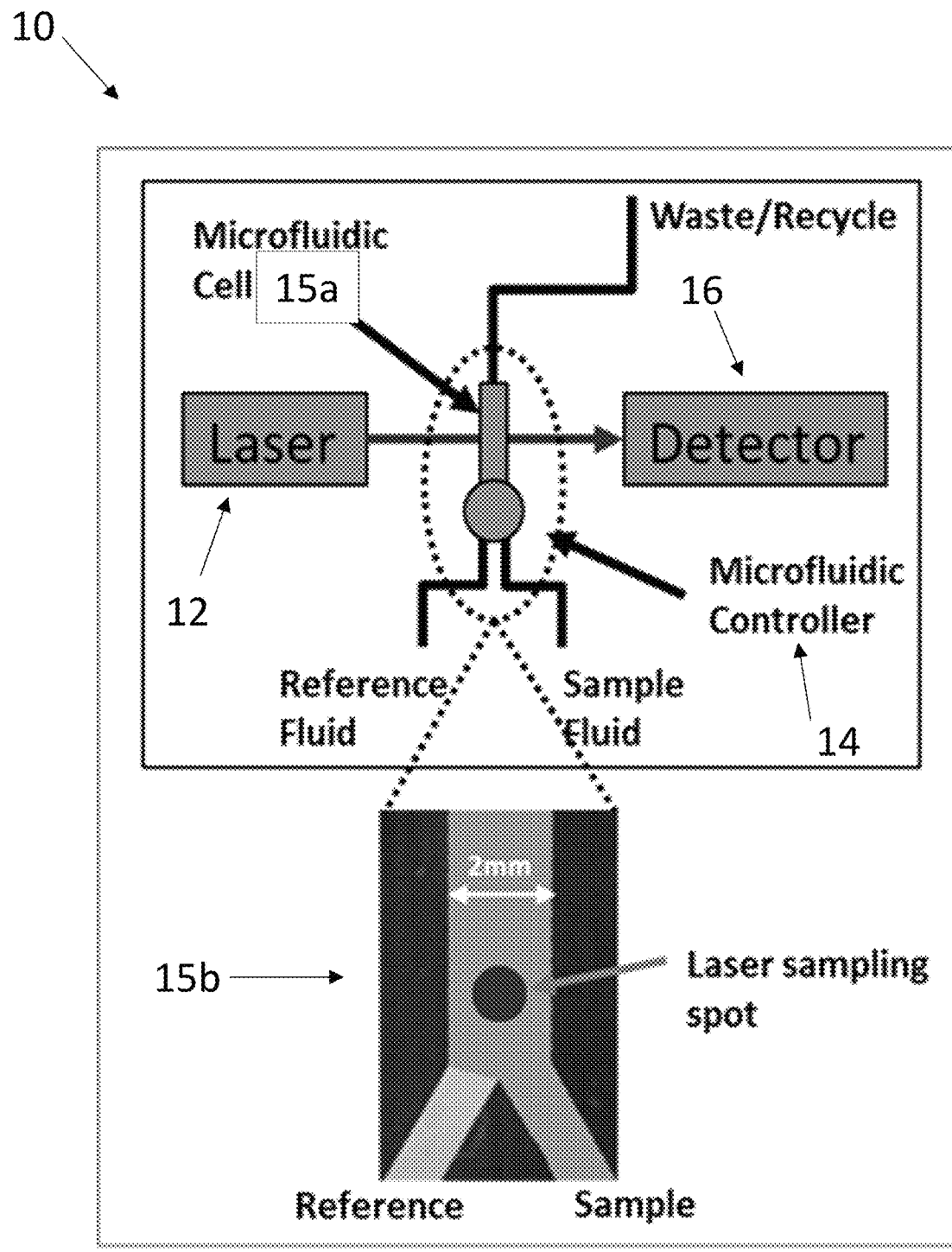
FIG. 1 shows a conceptual drawing of architecture and components of a bioanalyzer according to an embodiment of the invention.

In illustrative embodiments, matched optical filters, and methods and systems for using matched optical filters for acquiring infra-red transmission, spectra of liquid analytes in very highly absorbing reference solutions are disclosed herein. The matched optical filters have transmission profiles that compensate for the very high absorbance of the reference solution by filtering out at least a portion of coherent light from a tunable infra-red (e.g., IR) optical laser in a substantially inverse manner to the absorbance of the reference solution. The transmission profile of the matched optical filter may be adjusted to compensate for differences in laser gain across a spectral region of interest of the reference solution where the differential transmission of the reference solution at each wavelength may vary by more than 150 times across the operating range. Thus, the matched optical filters make it possible to obtain spectra of the liquid analyte that may have several orders of magnitude lower absorbance than the reference solution. Details of illustrative embodiments are discussed below.

Very Strong Background Absorption of Water

When studying the structure of a protein involved in biological processes, it is advantageous to measure the protein in its native formulation. As regarding proteins in animals, and humans in particular, the native formulations involve water. For example, in biopharmaceuticals, most protein solvents are aqueous with only small amounts of other buffers such as salts, sugars, and fatty acids. Thus, the majority of the solution is water.

Depending on the spectral regions of the protein that are of most interest, it is possible that the water in which the protein is dispersed may interfere with collecting the relevant structural information. Even though the presence of the water may make determining the structure of the protein more difficult, it is important to determine the structure of the protein in the water solvent, because the solvent in which the protein is dispersed affects the secondary structure and stability of the protein. Therefore, it is crucial to establish testing and measurement protocols that limit the optical interference of the background solvent (e.g., water).

For many proteins of interest, a protein secondary structure measurement is typically done in the "Amide I region" of the infrared absorption spectrum which is contained within 1580-1720 cm-1. This region is the most informative for determining secondary structure content such as alpha helix, beta sheet, and beta turn. Structural determination is done by fitting gaussian peaks for each structure under a broader absorption curve. Small changes in the broader absorption curve can cause errors in this fitting process, so any measurement of this area should be done in an accurate and repeatable manner.

In the 1580-1720 cm-1 region of the infra-red (IR) portion of the spectrum, water has a very strong absorption. Liquid water has a maximum absorption of 0.12 AU (e.g., arbitrary units) per micron of pathlength in this spectral region and a minimum absorption of 0.035 AU per micron. The peak absorption of liquid water is at approximately 1645 cm-1. For cell path lengths on the order of 23 um, only one laser photon out of 700 incident on the cell will pass through the fluid. Since AU is a log scale, in transmission at a measurement pathlength of 30 um this would range from 0.00021% T to 8.9% T (where % T is percent Transmission). That is, in order to measure a sample of liquid water with a measurement pathlength of 30 um would require a detector having a dynamic range of >450×. Thus, since buffers and samples are in mostly aqueous solutions, the effect of the presence of water is true for all tests. Furthermore, when trying to measure analytes that are strongly absorbing samples in larger amounts, such as 200 mg/mL, there can be another factor of 30× attenuation.

Detectors such as MCT (e.g., mercury cadmium telluride) photovoltaic or photoconductive elements are typically used for such sensitive measurements. The photon flux incident on such a detector must be several times larger than the noise equivalent power of that detector. So, at the peak water absorption the detector must produce a usable voltage signal to be accurately digitized. This may typically be at least 200 mV. At the more transmissive portion of the spectrum this signal would become unusually large (200 mV*450×=90V). Additionally, photodetectors are often non-linear which further compresses the usable dynamic range. Thus, the dynamic range required by a detector that covers this spectral range would be too large and it is therefore important to attenuate the light in the regions of the water absorption that are transmissive and allow light in the less transmissive regions to be allowed to pass through to the detector.

For example, a protein such as HEWL (Hen Egg White Lysozyme) at a concentration of 2 mg/mL will have an absorption of 0.012 AU in a 22 um pathlength cell or 0.0005 AU per micron. The protein absorption is a factor of >200× smaller than the water absorption. When measuring a protein solution such as this, any small residual error in ratioing out the water spectrum can carry over into huge errors in the protein spectrum.

Absorbance is related to the molar absorptivity (e.g., the absorption coefficient) of a material, the concentration of the material (e.g., amount of the material), and the pathlength of a sample chamber. That is, by changing one or more of the concentration of the material or the pathlength of the sample cell, it is possible to change the absorbance of a sample of liquid analyte and reference solution. In addition, the absorptivity of a material is wavelength dependent. Therefore, when designing a matched optical filter it is important to know the absorptivity of the sample (e.g., liquid analyte) and the reference solution, as well as the wavelength range that is to be used to measure the absorption of the liquid in the sample chamber.

For example, when a sample material that is to be measured has a weak absorptivity, it may be necessary to increase one or more of the concentration of the sample, the pathlength of the sample cell, or the intensity of the emitted light. Therefore, depending on the chemical species of sample material and the reference solution, there may be wide range of pathlengths (e.g., sample chamber sizes) that may be employed. For example, a pathlength may range between about 2 um and about 120 um, or may range between about 20 um and about 30 um, or range between about 22+/−0.5 um and about 27+/−0.5 um, or about 22 um and about 27 um, or between about 5 um and about 7 um.

An ideal pathlength depends on the amount of analytes present (a longer pathlength means greater contrast) and the signal-to-noise-ratio (e.g., SNR), since a longer pathlength means fewer photons passing through. However, an excessively long pathlength can cause the water layer to heat up, resulting in a shift in the background, and will consume significantly more sample volume.

In embodiments, a matched optical filter may be designed that optimizes the transmission profile pathlength FIG. 1 shows a conceptual drawing of architecture and components of a bioanalyzer 10 that is configured to measure the infra-red (e.g., IR) spectra of a liquid analyte (e.g., sample fluid) and a reference solution in which the liquid analyte is dispersed. In this conceptual drawing, the components of the bioanalyzer 10 include a light source 12 (e.g., a laser), a microfluidic controller 14, and a detector 16. The microfluidic controller 14 includes a fluid delivery system via a microfluidic cell 15a (e.g. a liquid flow cell) that has a sample chamber 15b (e.g., sample cell). The microfluidic controller 14 controls the flow of two fluids that are flowed into and out of the sample chamber 15b in an alternating fashion. The microfluidic cell 15a is positioned in a beam path of an infra-red (e.g., IR) light that is emitted from the light source 12 and is directed to pass through the sample chamber 15b and proceed to the detector 16.

The microfluidic cell 15a has two inlet channels, one for the sample fluid and one for the reference fluid, and an outlet channel for waste. The height (e.g., the optical pathlength) of the cell channel is on the order of 23 um. Using gas pressure, sample fluids and reference fluids are alternately pushed through the outlet channel. On/off modulation of the flow fluid from each channel is controlled by a microfluidic valve, one for each path (not shown). Furthermore, in embodiments, pushing the fluids through the outlet channels may be accomplished with other types of pumps, such as, syringe pumps, diaphragm pumps, and the like.

The use of microfluidic techniques have additional advantages. The sample fluids (e.g., liquid analyte) and buffers (e.g., reference fluids) can be changed externally, at will, without hardware changes in the optical path. Furthermore, with the ability to continuously measure samples, the system also allows for use in an on-line application scenario, where process analytical technology and quality control features can be exploited.

Measurement of the sample fluid transparency (e.g., optical absorption spectrum) is conducted when the sample has fully pushed through the optical interrogation region, flushing out all measurable transparency effects of the reference fluid.

Likewise, the measurement of the reference fluid transparency is made once it has pushed fully through the optical interrogation region, removing all measurable effects of the transparency of the sample fluid.

The modulation of the on/off flow fluid from each channel can be operated at a rate of between about 0.1 cycles per second and 50 cycles per second without moving the sample cell. There are advantages to modulating the fluids as quickly as possible. For example, rapid switching times can reduce drifts in light signal or detector dark background signal, as well as decrease noise terms that have 1/f characteristics.

The use of a tunable laser with the rapid on/off fluid switching times enables the generation of a high optical power at the measurement wavelengths, which can be used to increase sample cell path length. This combination enables an improved signal to noise ratio on spectral measurements relative to more conventional forms of spectroscopy.

The ability to take measurements on a rapid time scale of up to 50 cycles per second provides the opportunity to monitor events as a function of time. For example, studying the kinetics of reactions and processes becomes possible when spectra can be measured at up to 50 cycles per second. It is possible to measure a thermal ramp with a faster temporal resolution. That is, by eliminating the need to switch in and out different ND filters, the use of a matched optical filter in a measurement system allows the measurement of fast events. This is quite important for looking at protein stability, enzyme reactions, and binding events. The ability to monitor kinetically fast chemical reactions and processes is a surprising result of incorporation of the matched optical filter in IR measurements.

Figure 2:
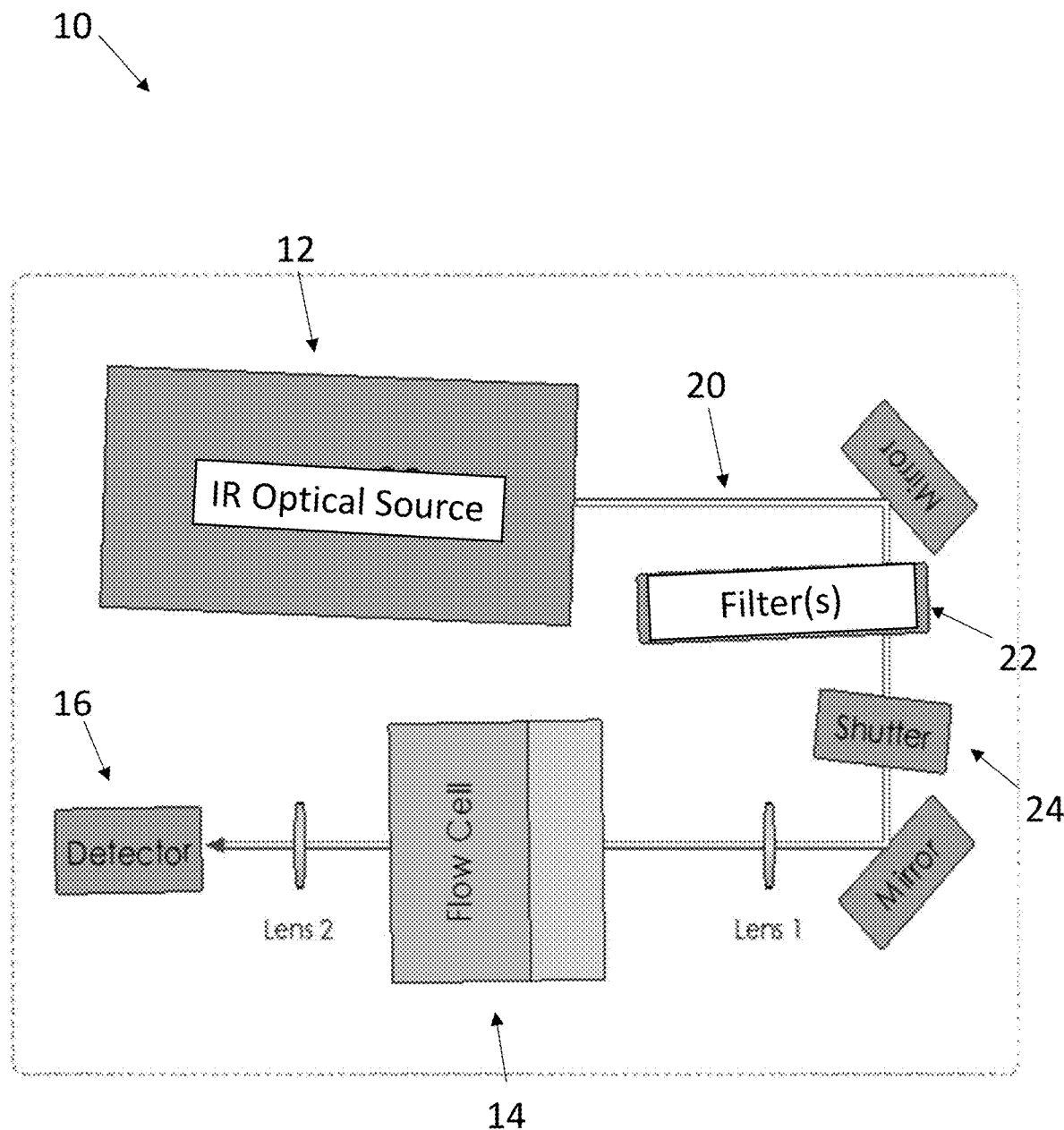
FIG. 2 shows a schematic layout of IR spectroscopic fluid analyzer according to an embodiment of the invention.

FIG. 2 shows a schematic layout of IR spectroscopic fluid analyzer 10 (e.g., bioanalyzer) according to an embodiment of the invention. The IR fluid analyzer 10 includes an IR optical source 12, an optical filter 18, an optical detector 16, and a microfluidic controller 14 (e.g., liquid flow cell). The IR fluid analyzer 10 also includes control and processing circuitry (not shown), also referred to as a "controller" herein. As indicated, the control and processing circuitry has external connections or interfaces to one or more of user input/output (I/O) devices (such as a display, key or touch input device, etc.), non-volatile storage (e.g., flash memory, magnetic storage device, etc.), and/or communications links or networks (e.g., TCP/IP network, HTTP interface, etc.).

The fluid analyzer 10 (e.g., IR fluid analyzer) is used to obtain measurements of optical properties of sample fluids (e.g., biological liquid analytes such as proteins) and reference solutions (e.g., a reference fluid, a salt, and/or a buffer solution) that are alternatively flowed into and out of the sample chamber of the liquid flow cell 14. The liquid flow cell 16 includes the microfluidic chamber and the sample cell (not shown), as described above. In operation, the IR optical source 12 produces an optical beam of desired wavelength and power, and this is directed through the sample chamber of the sample cell toward the optical detector 16. As shown in FIG. 2, directing the optical beam along the beam path includes mirrors, filters, and an optional shutter 24. The optical arrangement illustrated in FIG. 2 is non-limiting. The optical detector 16 generates respective output signals indicating the strength of the optical signals incident thereon, which are provided to the control and processing circuitry.

Using techniques generally known in the art, the control and processing circuitry uses the values represented by the detector output signals to calculate corresponding optical properties of the fluid sample, such as absorbance, and these optical properties are interpreted as functional indications about the samples (e.g., whether a sample contains a certain compound or a detailed structure). These indications may be used in higher-level assessments according to the testing or research being conducted, again as generally known in the art. In the course of these operations, the control and processing circuitry may transmit raw and/or processed test values to external devices/systems such as the user I/O devices, storage, communications etc.

This description uses the term "beam path" 20 to describe the path of an optical beam from a source to a detector, via the sample cell 15b. FIG. 2 shows a transmissive configuration in which the beam path 20 extends through the sample cell from one side to the other. This configuration is generally assumed in the remaining description. However, an alternative system may employ a reflective configuration in which the beam path 20 is incident at one side of the sample cell and is reflected thereby to a detector arranged on the same side. As an example, the sample cell may have a sandwich type of structure of glass, separator, glass. If both glasses are transmissive, then the overall sample cell is transmissive. If the exit-side glass is reflective, then the sample cell is reflective. However, the reflective sample cell has the disadvantage that the physical pathlength is one half of the optical pathlength, and therefore the fluid resistance is very high in comparison to the transmissive version of the sample cell.

measurement may therefore be advantageous. In many spectroscopic methods, the fluidic cell that contains the fluid under test, and the measurement technique associated with the cell, are important aspects of fluid and sample minimization. Spectroscopic methods typically perform a comparison of sample and background (reference) fluids, with the ratio of the two responses being referred to herein as differential absorbance or diffAU. In many applications, it is also preferred that disposable cells be used, which may be preferable for applications requiring thermal or chemical denaturing of proteins during the testing, for example.

The patents and applications listed in Table 1 provide context on optical measurement techniques of the general type described above. The disclosure of which is incorporated herein, in its entirety, by reference.

TABLE 1

Listing of patents and applications provide context on optical measurement techniques of the general type described above.

| Jurisdiction | App or Issue No. | Filing or Issue Date | Title |
| --- | --- | --- | --- |
| USA | 14/673,015 | Mar. 30, 2015 | Fluid Analyzer with Modulation for |
|  | 9,625,378 | Apr. 18, 2017 | Liquids and Gases |
| USA | 14/693,301 | Apr. 22, 2015 | Motion Modulation Fluidic Analyzer |
|  | 9,377,400 | Jun. 28, 2016 | System |
| USA | 15/175,709 | Jun. 7, 2016 | Motion Modulation Fluidic Analyzer |
|  | 9,778,167 | Oct. 3, 2017 | System ($1^{st}$ Continuation of 9,377,400) |
| USA | 15/605,962 | May 26, 2017 | Microfluidic Methods and Apparatus for Analysis of Analyte Bearing Fluids |
| USA | 15/454,033 | Mar. 9, 2017 | Fluid Analyzer with Modulation for |
|  | 10,190,969 | Jan. 29, 2019 | Liquids and Gases. ($1^{st}$ continuation of 9,625,378) |
| USA | 15/714,035 | Sep. 25, 2017 | Motion Modulation Fluidic Analyzer |
|  | 10,180,389 | Jan. 15, 2019 | System. ($2^{nd}$ continuation of 9,377,400) |
| USA | 16/218,875 | Dec. 13, 2018 | Motion Modulation Fluidic Analyzer |
|  | 10,746,646 | Sep. 9, 2020 | System. ($3^{rd}$ continuation of 9,377,400) |

In one embodiment, the optical source 12 may be realized using a mid-IR laser, such as fixed frequency, or tunable QCL lasers. These are tuned to suitable wavelength(s) for measuring analyte(s) of interest, such as the peak of an absorbance feature chosen to minimize background interferences. The optical source 12 (e.g., IR optical source) may be coupled to the sample cell through a matched optical fiber 22.

Generally, measurements are differential in nature. That is, they are based on differences in optical response of samples of interest (e.g., a liquid analyte) and a reference solution (e.g., a prescribed reference solution). A prescribed reference solution may be chosen as a suitable blank, such as pure solvent, a gas, or other suitable reference material or mixture representative of a sample background.

The system may employ one or multiple shutters, as described more below. In one example, a shutter configuration 24 may include a flag that can be moved into and out of the beam path 20. In another example, the shutter 24 may include a chopper wheel on either side of the sample cell which alternatively passes light to the detector 16 or blocks the sample and/or reference beams prior to the sample chamber 15b.

In the measurement of fluids using spectroscopic techniques, minimizing the volume consumed in the measurement may be important, because of cost and/or limited availability of analytes of interest. Techniques that reduce the volume of fluid or quantity of analyte required for the In some embodiments, the disclosed spectroscopic methods and systems typically perform a comparison of sample and background (reference) fluids, with the ratio of the two responses being referred to herein as differential absorbance or diffAU. This method requires that spectra from each of the sample (e.g., liquid analyte) and the reference (e.g., a reference solution) are measured on a similar scale to allow a diffAU analysis.

However, as described above, in some IR spectral regions of interest, water may have a >200× stronger absorption than the analyte. Furthermore, depending on the region of interest, the water absorption may also have >450× dynamic range variation of voltage measured by a detector.

Figure 3A:
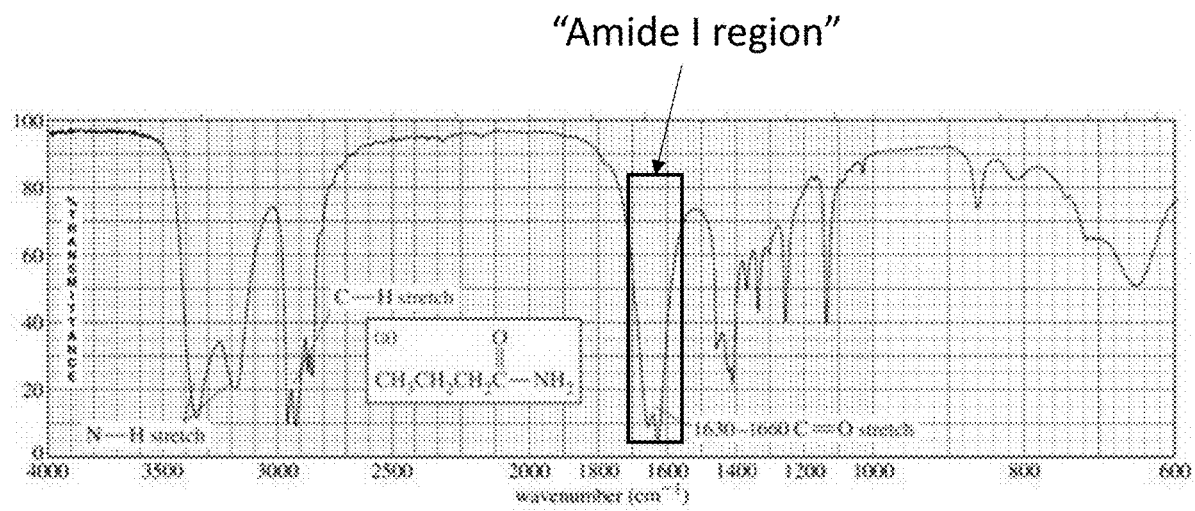
FIG. 3A shows an IR transmission spectrum of an organic Amide sample.

For example, in order to measure a secondary structure measurement of a protein, IR absorption spectroscopy is characterized in the "Amide I region" of the infrared absorption spectrum which is contained within 1580-1720 cm-1 spectral region. FIG. 3A shows an IR transmission spectrum of an organic Amide sample. The Amide I region is identified inside of the rectangle in FIG. 3A. This Amide I region includes the span from between 1630 cm-1 to 1660 cm-1, which relates to the C=O stretching mode.

Figure 3B:
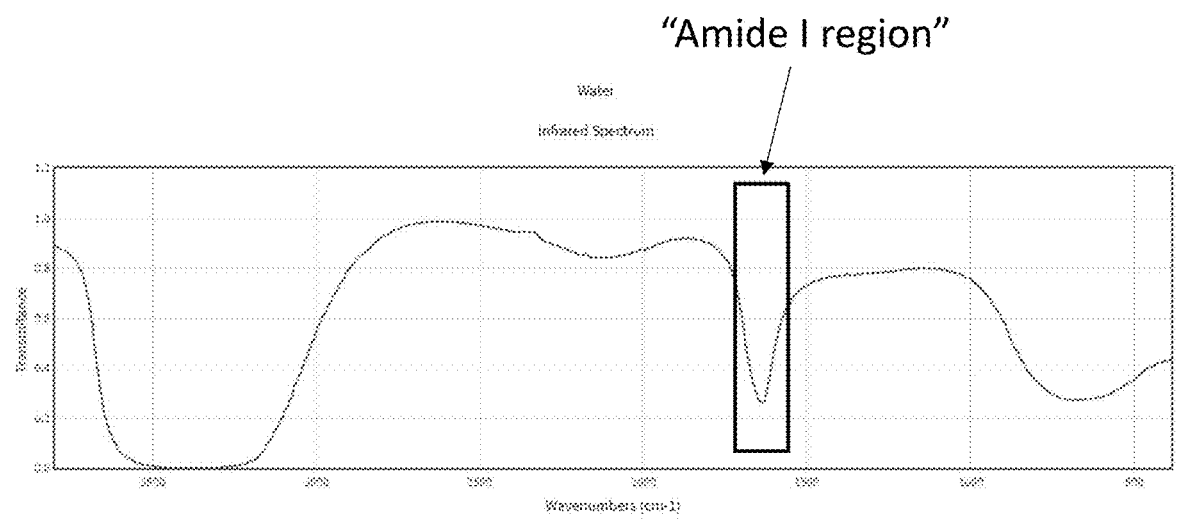
FIG. 3B shows an IR transmission spectrum of liquid water.

FIG. 3B shows an IR transmission spectrum of liquid water. The corresponding "Amide I" spectral region in the water transmission spectrum is identified by the box in FIG. 3B. Not only does the peak absorption of water at approximately 1645 cm-1 directly overlap the Amide I region of interest, the peak shape also indicates that the absorption is strongest at the peak and the absorption falls off very quicky away from the peak at 1645 cm-1. That is, the water allows much more of the IR light to be transmitted through that water at wavenumbers above and below the peak.

Figure 4A:
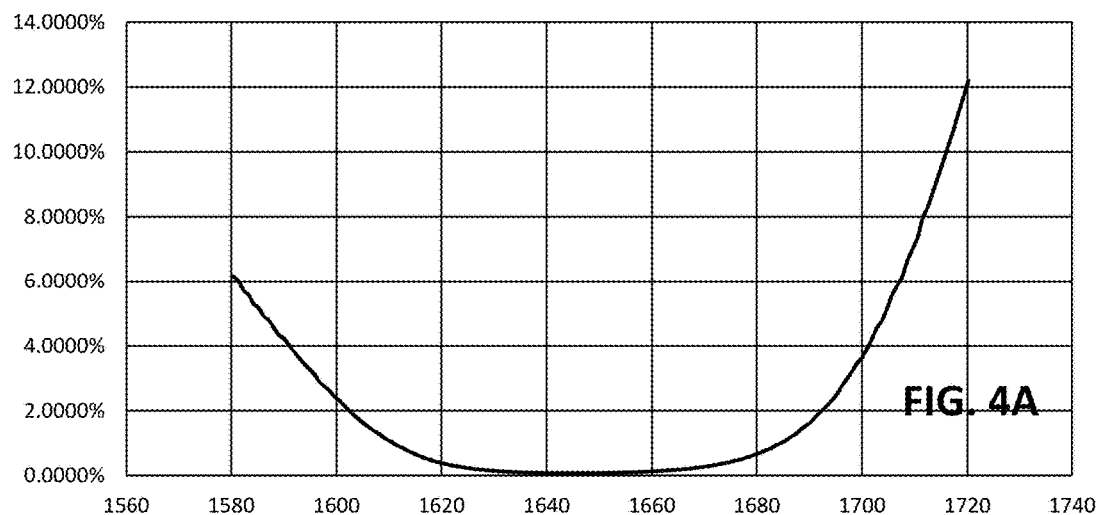
FIG. 4A shows a transmission spectrum of liquid water in a sample cell.

FIG. 4A shows a transmission spectrum of liquid water in a sample cell having a thickness of 22 um, meaning that the water sample has a cell path length of 22 um. In the spectral region between about 1720 cm-1 and 1580 cm-1, the water has a transmission minimum (e.g., peak absorbance) between about 1630 cm-1 and 1660 cm-1, with transmittance of 0.00021% T, whereas the transmittance goes to beyond 8.9% T on the side wings of the spectrum.

Figure 4B:
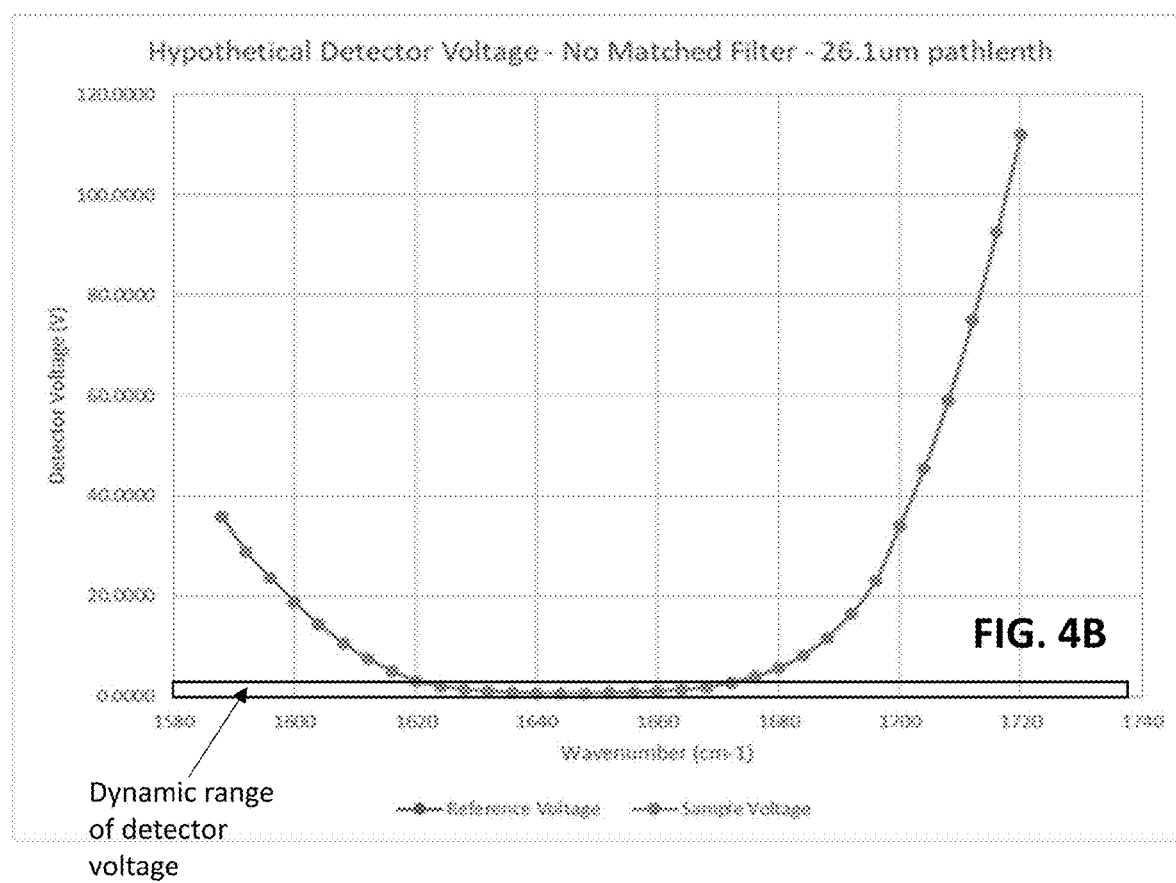
FIG. 4B shows a hypothetical detector voltage for both a liquid analyte sample and a reference solution.

FIG. 4B shows a hypothetical detector voltage for both a liquid analyte sample and a reference solution without a filter for a modeled pathlength of 26.1 um. Several points can be noticed in this figure. First, it can be seen that the detector voltage ranges from less than 1 to greater than 30. Second, the rectangle along the 0 voltage baseline indicates a usable range of detector voltages, from about 200 mV (e.g., millivolts) to about 3 V. Third, it is not possible to differentiate the sample spectrum from the reference spectrum. Therefore, it is necessary to introduce one or more filters into the laser path length to filter out the very strong signal arising from the side wings of strong transmittance.

A common way to take measurements within the given dynamic range is to repeat tests with commercially available neutral density filters, each of which has a relatively flat response over the wavelength range.

Figure 5A:
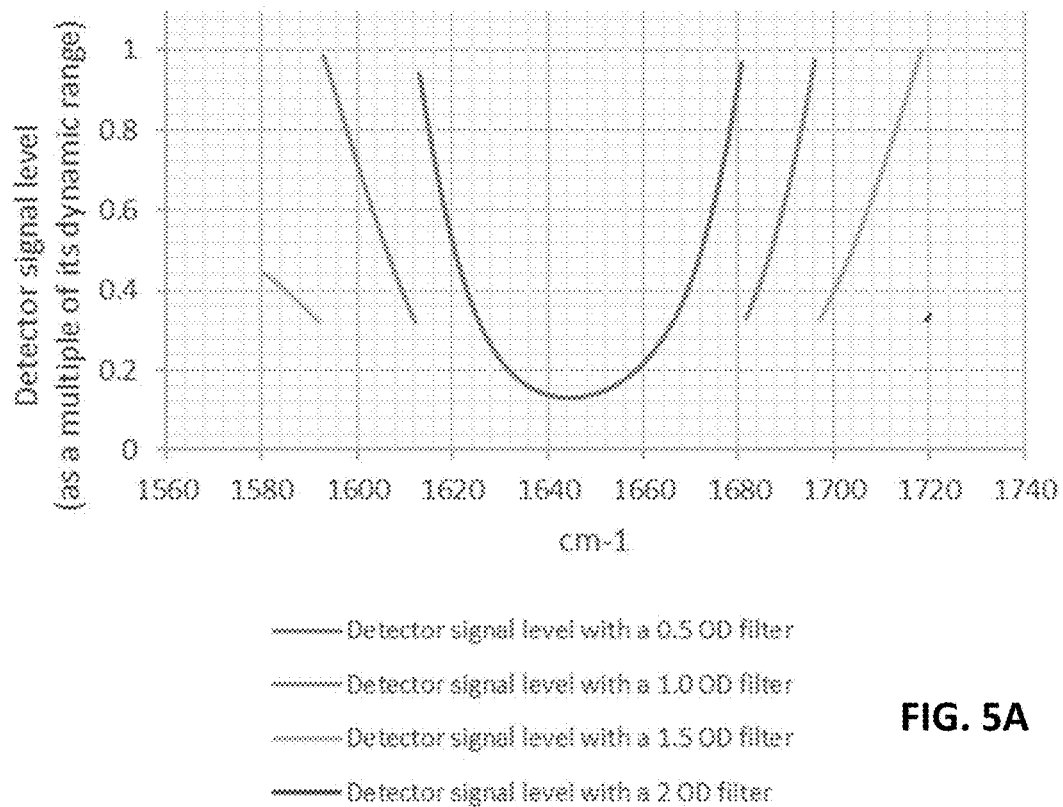
FIG. 5A shows detector signal level as a function of its dynamic range for water spectra that was gathered using several neutral density filters.

FIG. 5A shows detector signal level as a function of its dynamic range for water spectra that was gathered using the following neutral density (e.g., ND) filters: 0.5 OD filter, 1.0 OD filter, 1.5 OD filter, 1.5 OD filter, and 2.0 OD filter. Using the ND filters, it is possible to measure the spectral range from 1580 cm-1 to 1720-1 and keep the detector signal level between about 0.1 to 1.0 normalized units of its dynamic range (with 1.0 equivalent to the maximum of the dynamic range). Here, tests were repeated 4 times with 4 different ND filters and then stitched in the post analysis to have all data points within the dynamic range. Compared to a single-scan test with no repeats, this practice costs at least 4 times more sample volume and test time.

Figure 5B:
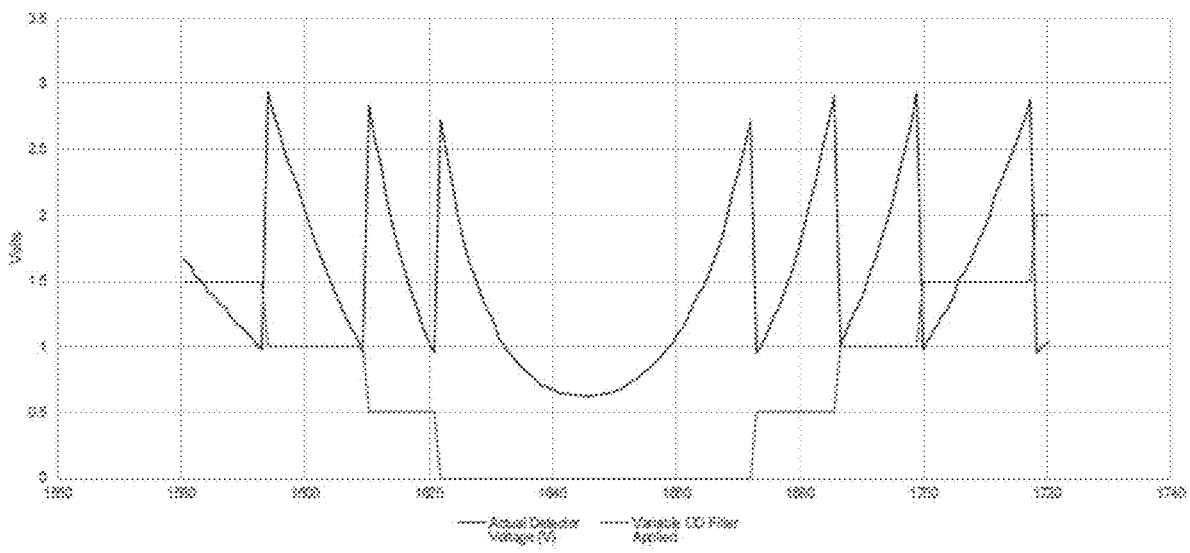
FIG. 5B shows the detector signal in Volts versus wavenumber.

FIG. 5B shows the detector signal in Volts versus wavenumber between 1580 cm-1 and 1720 cm-1. FIG. 5B also includes a trace representing the variable ND optical density filter. As shown in FIG. 5B, the side wings of the spectra have been scaled by the ND filters to the dynamic range of the detector. The scaled side wings are mathematically stitched together. The sample and reference samples are similarly stitched together so that ratios can be taken and the spectra arising from the sample can be modeled.

The inventors developed a method of optically leveling the incoming infrared energy passing through a thin liquid water layer using a matched optical bandpass filter. An optical bandpass filter has a transmission profile that allows a specific wavelength band to pass while variably attenuating the light to a specific curve. Such wavelength passband filters can be designed with a center wavelength, passband width, and passband shape to create an inverse of the water absorption shape. The design characteristics (e.g., center wavelength, width, and shape) can be achieved by stacking multiples of thin interference layers on a substrate that is transparent in the desired wavelength range.

Described herein is the development of a matched optical filter that has a transmission profile that is matched to a spectral region for a particular reference solution. The transmission profile of the matched optical filter is configured to substantially flatten the very high absorbance of a prescribed reference solution signal across at least a portion of the optical spectrum of interest (e.g., the region corresponding to the region of interest for the liquid analyte). The portion of the coherent light from the tunable optical laser is filtered in a substantially inverse manner to the absorbance of the prescribed reference solution.

Referring to FIG. 2, the matched optical filter 22 may be located on any optical surface in the laser beam path 20, including the laser window, a sample cell window, one or more mirrors, a filter substrate 22, and the like. The matched optical filter 22 may be incorporated into the optical path in a transmissive configuration or in a reflective configuration.

In embodiments, an anti-reflection (AR) coating may be deposited on a side of the matched optical filter substrate that is opposite the side with the matched optical filter. An AR coating can increase the transmittance of the filtered light through the filter by reducing internal reflection of the filtered light off of the inside surface back side (e.g. exit side) of the matched optical filter substrate. AR coatings may be formed from stacks of transparent thin film structures with alternating layers of contrasting refractive index.

Figure 6A:
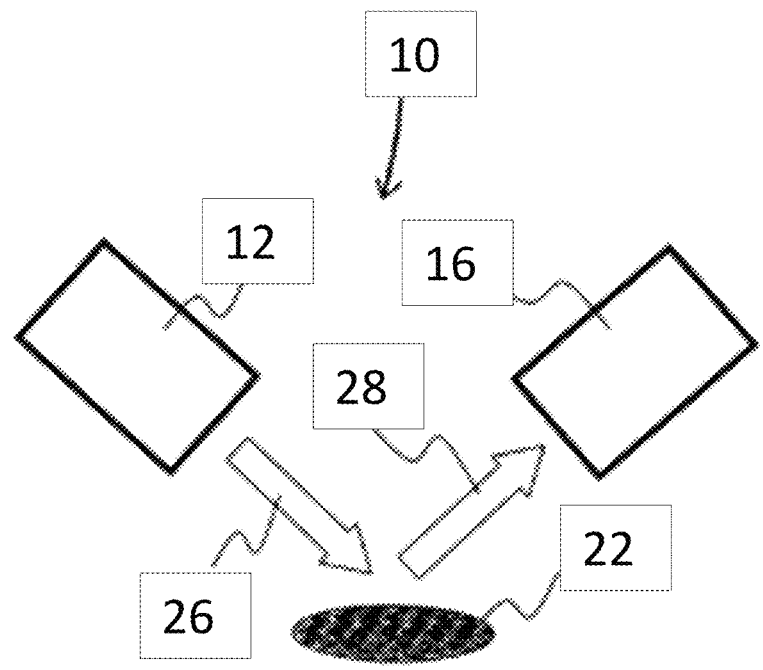
FIG. 6A provides a schematic drawing showing a matched optical filter in reflective configuration.

FIG. 6A provides a schematic drawing showing a matched optical filter 22 in reflective configuration. The light source 12 emits a light 26 that is reflected off of the matched optical filter 20 as reflected light 28 which is detected in detector 16.

Figure 6B:
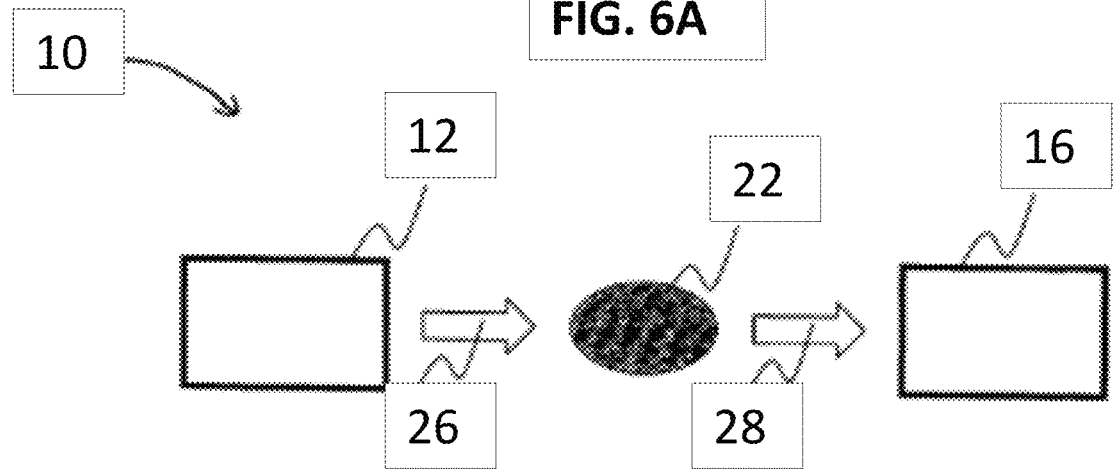
FIG. 6B provides a schematic drawing showing a matched optical filter in a transmissive configuration.

FIG. 6B provides a schematic drawing showing a matched optical filter 20 in a transmissive configuration. The light source 12 emits a light 26 that is transmitted through the matched optical filter 22 as transmitted light 28 which is detected in detector 16.

Figure 7:
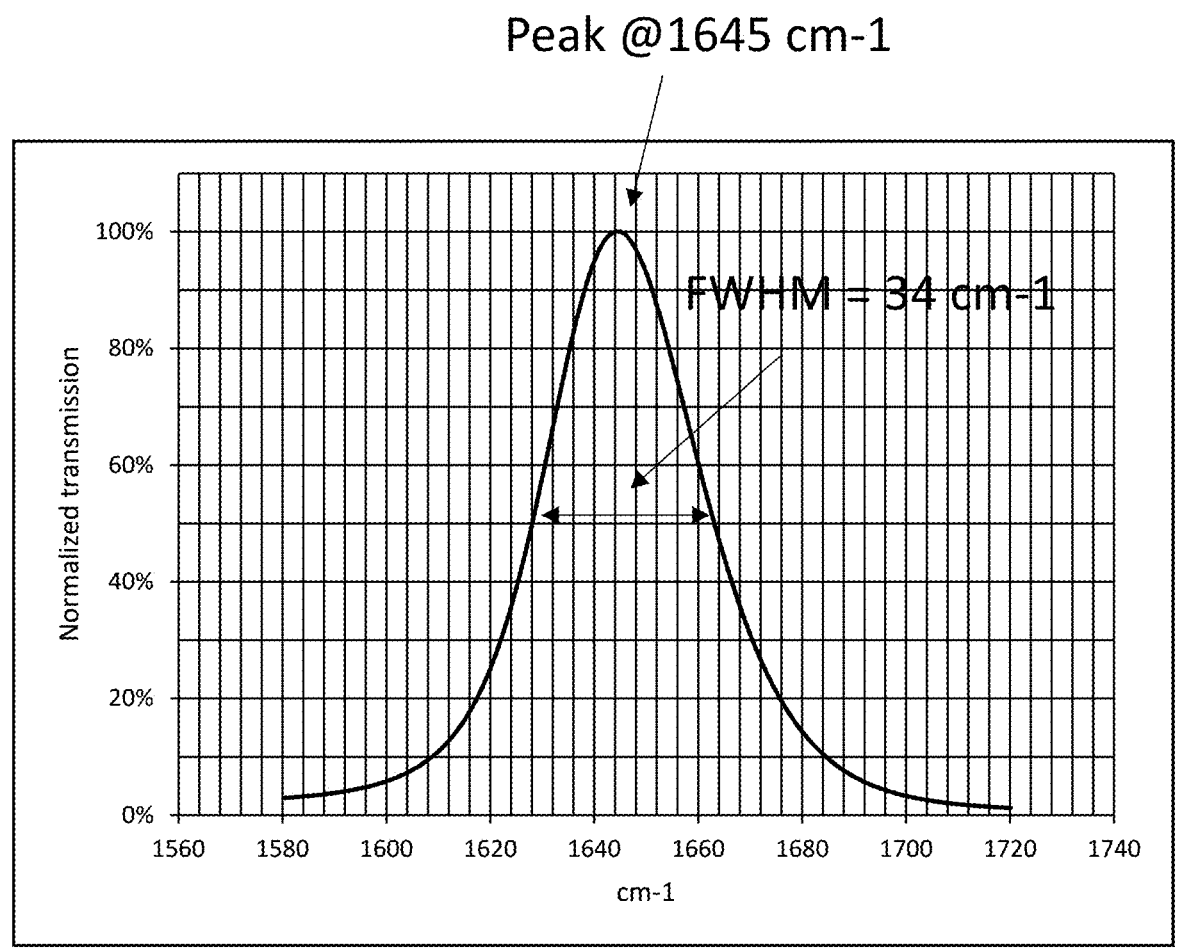
FIG. 7 shows a normalized transmission versus wavenumber spectrum.

FIG. 7 shows a normalized transmission versus wavenumber spectrum (e.g., transmission profile) for a matched optical filter from 1580 cm-1 to 1720 cm-1. The transmission profile of the matched optical filter in FIG. 7 has a peak at 1645 cm-1, and a full-width-at-half maximum (FWHM) of 34 cm-1. This filter is optimized to allow measurement of Amide I IR spectral regions.

Figure 8A:
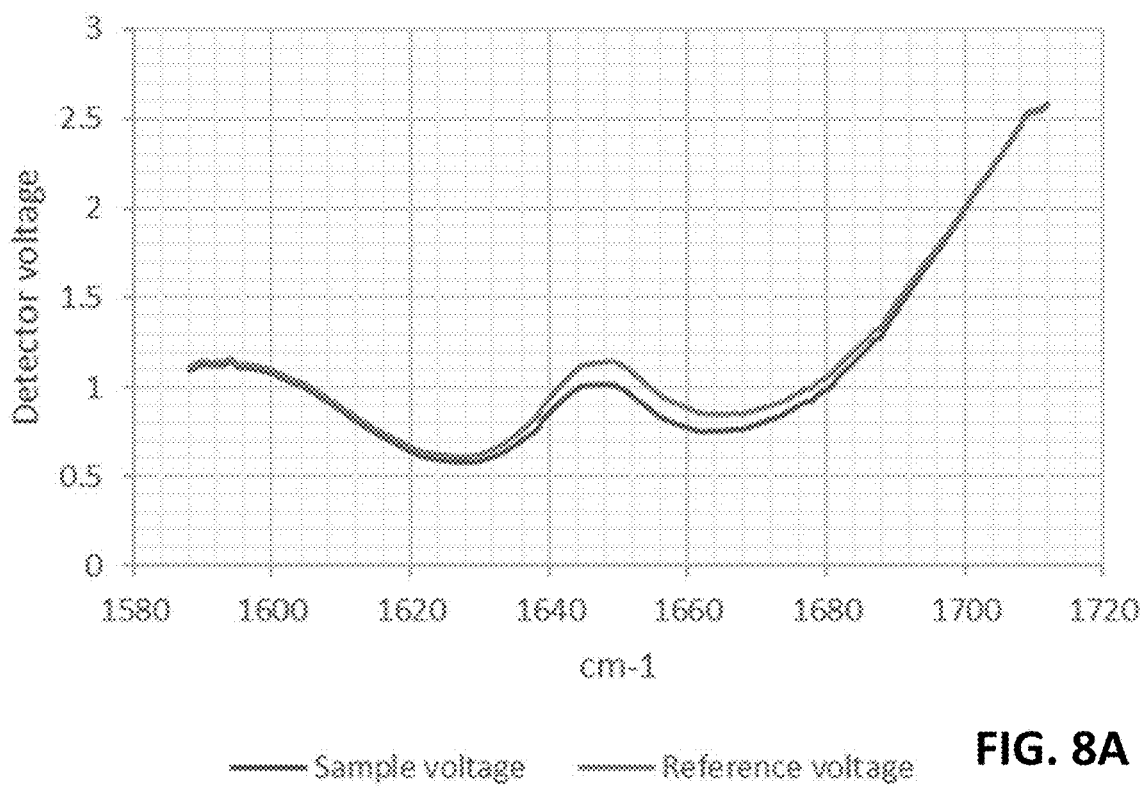
FIG. 8A shows raw data from scans of a liquid analyte sample and a prescribed reference solution.

FIG. 8A shows raw data from scans of a liquid analyte sample and a prescribed reference solution taken on an IR spectroscopic measurement system and using a matched optical filter similar to the one described in FIG. 7, according to an embodiment the invention. The sample voltage and the reference voltage are shown in the spectral range of between about 1590 cm-1 and 1710 cm-1.

Figure 8B:
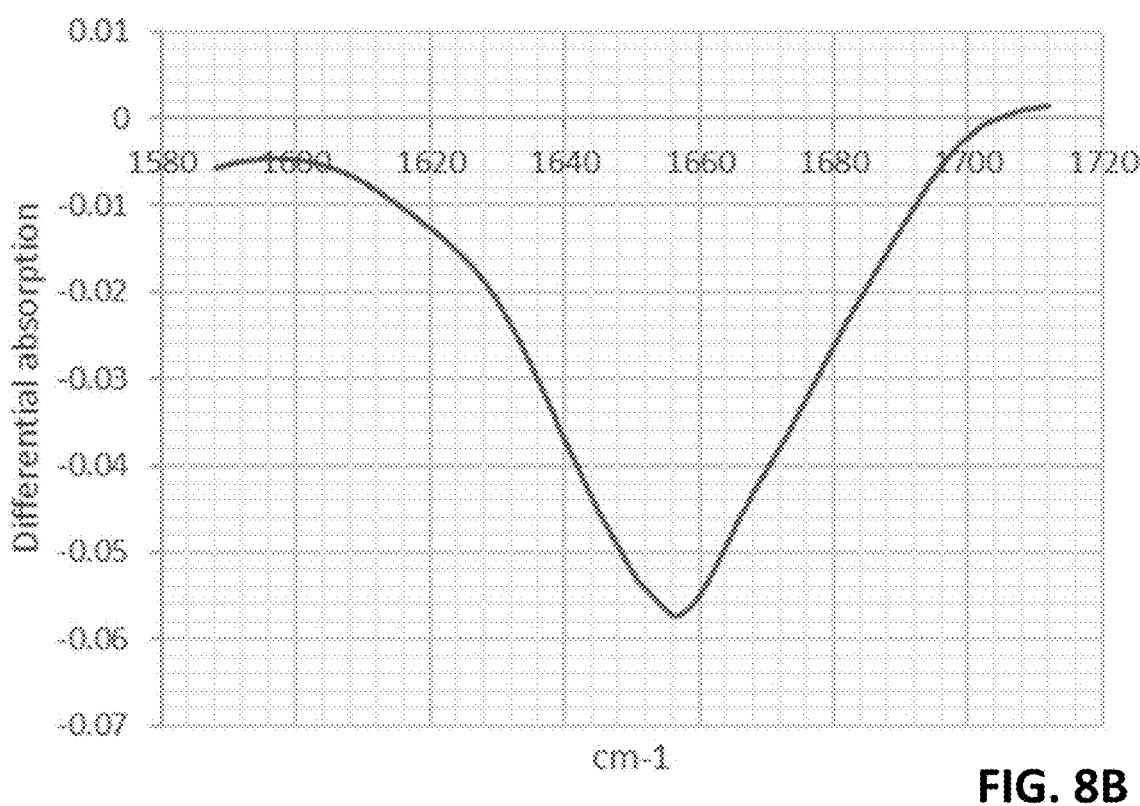
FIG. 8B shows a calculated differential absorption spectrum.

FIG. 8B shows a calculated differential absorption spectrum. That is, a log 10 of the ratio of the sample transmission spectrum to the reference transmission spectrum. All of the water portion of the spectrum is subtracted out, and only the protein structure spectrum remains.

Figure 9A:
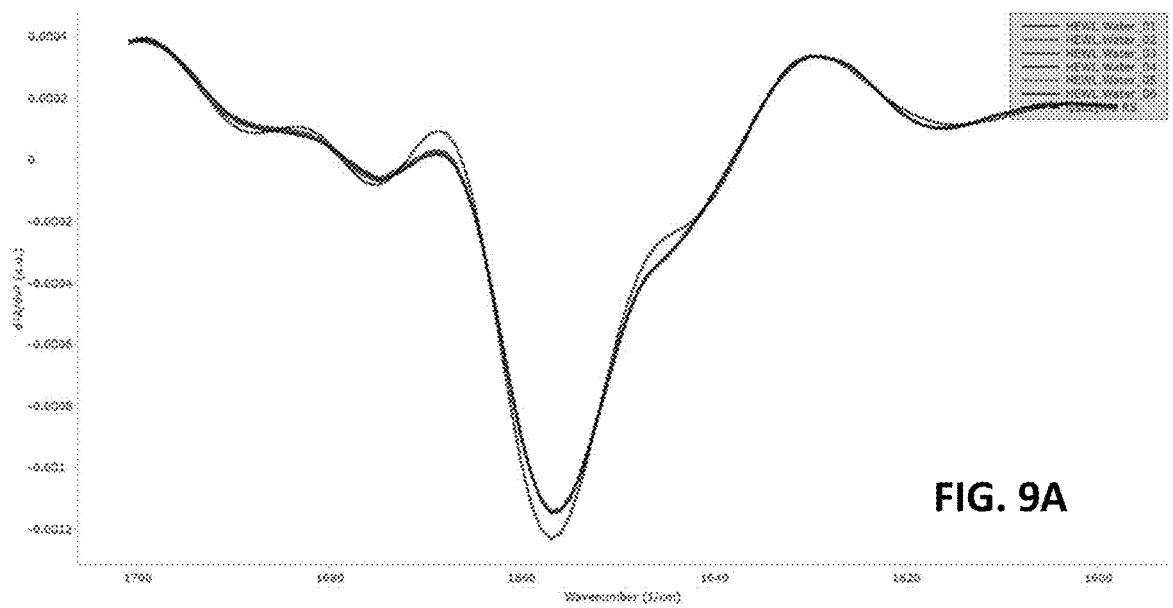
FIG. 9A shows a second derivative of the sample spectrum.

FIG. 9A shows a second derivative of the sample spectrum shown in FIG. 8B. The second derivative plot provides key metric information for protein analysis.

Figure 9B:
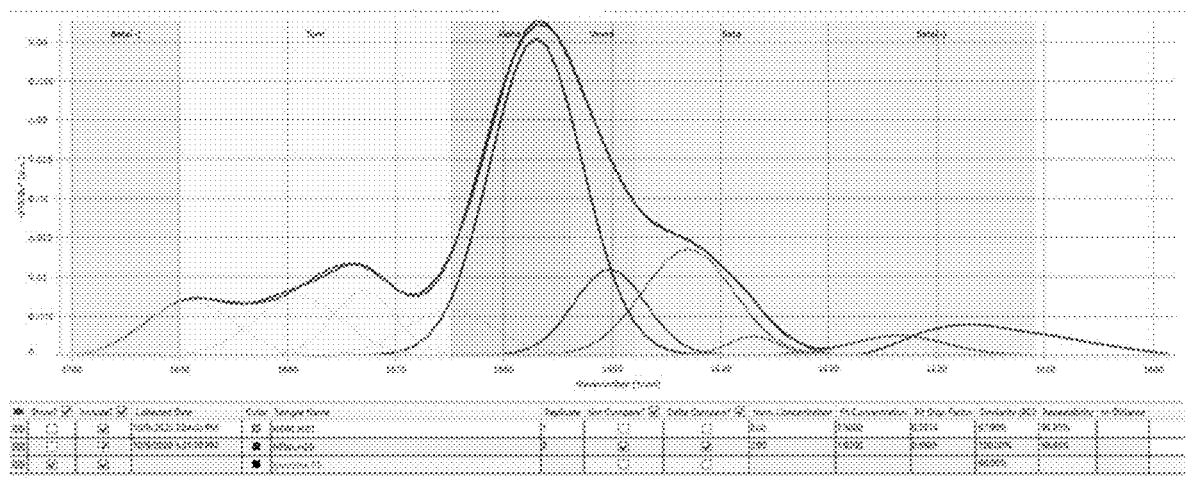
FIG. 9B shows a gaussian fit of protein secondary structure to an absorbance spectrum.

FIG. 9B shows gaussian fit of protein secondary structure to an absorbance spectrum, as in FIG. 9, with a modeled deconvolution of particular structural features. The individually modeled spectra provide information about the chemical structure of the liquid analyte. This region is the most informative of determining secondary structure content such as alpha helix, beta sheet, and beta turn. Structural determination is done by fitting gaussian peaks for each structure under a broader absorption curve as shown in FIG. 9B. Small changes in the broader absorption curve can cause errors in this fitting process, so any measurement of this area should be done in an accurate and repeatable manner.

What the inventors discovered, and what was not apparent previously, is that an optical filter could be matched to the strong absorption of a spectral region of a particular reference solution to substantially flatten the very high absorbance of a prescribed reference solution signal across at least a portion of an optical spectrum. It is surprising that a portion of the coherent light from the tunable optical laser can be filtered in a substantially inverse manner to the absorbance of the prescribed reference solution to allow measurement of a sample and a highly absorbing reference solution in a single measurement without any neutral density filters.

Figure 10:
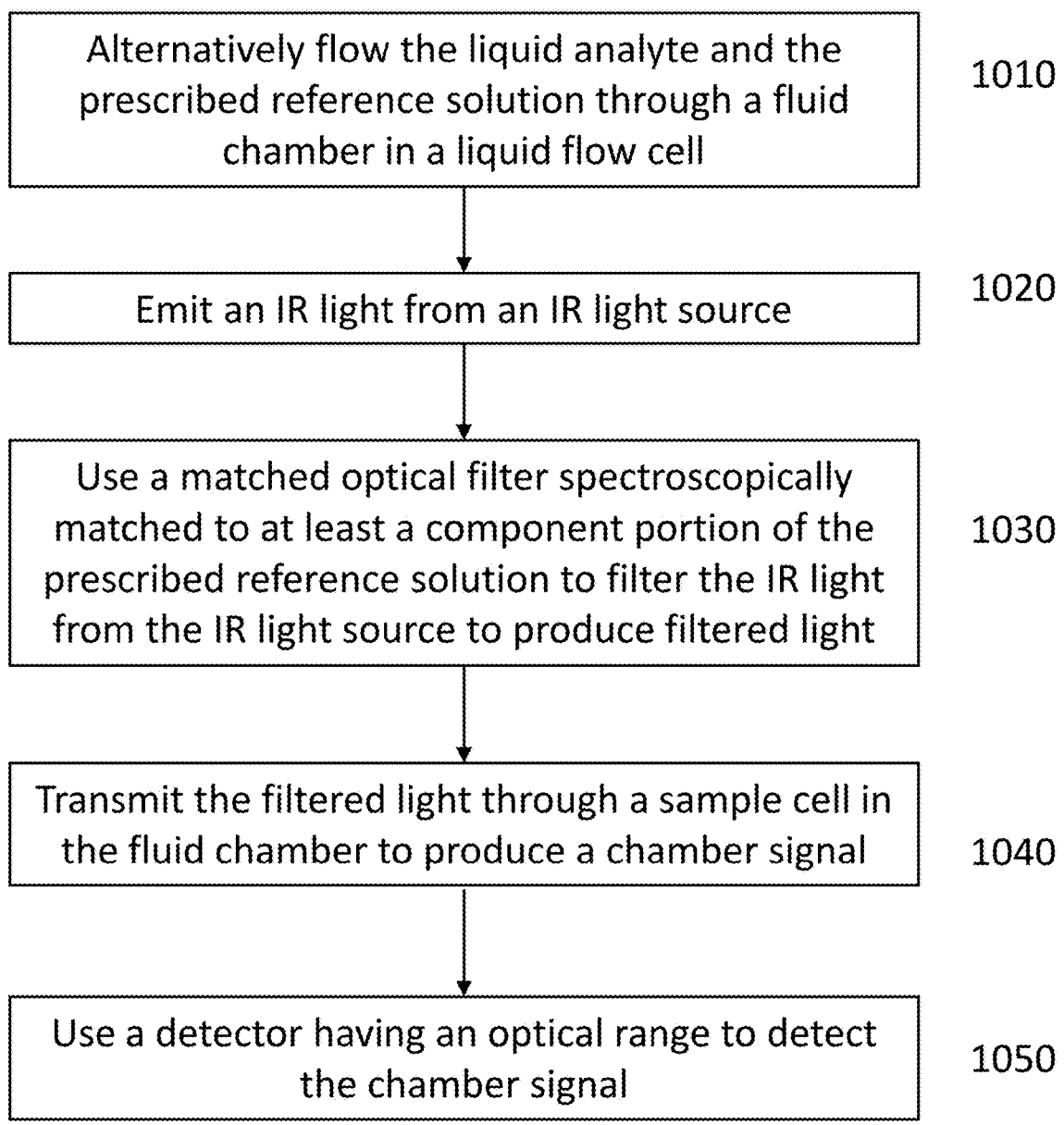
FIG. 10 shows a flow diagram of a method to measure a liquid analyte with a weak absorbance in a prescribed reference solution with a very high absorbance.

FIG. 10 shows a flow diagram 1000 of a method to measure a liquid analyte with a weak absorbance in a prescribed reference solution with a very high absorbance.

At step 1010, alternatively flow the liquid analyte and the prescribed reference solution through a fluid chamber in a liquid flow cell. A microfluidic controller controls the channels of a fluid delivery system that alternates flow of the liquid analyte and the prescribed reference solution the liquid flow cell. The modulation of the on/off flow fluid from each channel can be operated a rate of between about 0.1 cycles per second and 50 cycles per second without moving the sample cell.

At step 1020, emit an IR light from an IR light source. The emitted IR light may be a coherent IR light from a tunable optical laser source. The tunable optical laser source may be a tunable optical quantum cascade laser (QCL) configured to operate in an IR region. The sample chamber in the microfluidic cell is positioned in a beam path of the IR light that is emitted from the light source and is directed to pass through the sample chamber and proceed to the detector.

At step 1030, use a matched optical filter spectroscopically matched to at least a component portion of the prescribed reference solution to filter the IR light from the IR light source to produce filtered light. The matched optical filter may be configured to filter at least a portion of the IR light from the IR light source in a substantially inverse manner to the absorbance of the prescribed reference solution. The filtered light may be through the fluid chamber to produce a chamber signal.

At step 1040, transmit the filtered light through a sample cell in the fluid chamber to produce a chamber signal. The filtered light may transmit through the sample cell in a transmissive mode or in a reflective mode. In a transmissive configuration, the light flows in a beam path that extends through the sample cell from one side to the other. In a reflective configuration, the light flows in a beam path that is incident at one side of the sample cell and is reflected thereby to a detector arranged on the same side.

At step 1050, use a detector having an optical range to detect the chamber signal. The matched optical filter is spectroscopically matched to at least one of: from between about 1600 cm-1 to about 1700 cm-1; from between about 1580 cm-1 to about 1720 cm-1; from between about 400 cm-1 to about 1200 cm-1; or from between about 3000 cm-1 to about 4000 cm-1. The detector may be spectroscopically matched to the matched optical filter.

In embodiments, an optional step includes providing a shutter. The shutter is configured to be positioned in an optical beam path of the filtered light such that the filtered light is blocked from reaching the sample cell at predetermined intervals.

In further embodiments, another optional step includes controlling the system with a controller that fully automates the liquid analyte and the reference solution handling, and fully automates measurement of the analyte signal and the reference signal. Additionally, the controller may provide automatic and continuous real-time background referencing.

The optional steps may be utilized individually, or in combination with the steps 1010 to 1040, inclusive.

EXAMPLES

The following examples are intended to further illustrate the disclosure and its preferred embodiments.

Example 1: Temperature Dependence of Water Spectra

Water spectra can change with temperature, and incident light can cause the temperature of the solution to change, therefore changing the spectrum. It's advantageous to do measurements quickly and at the lowest incident power possible.

Figure 11:
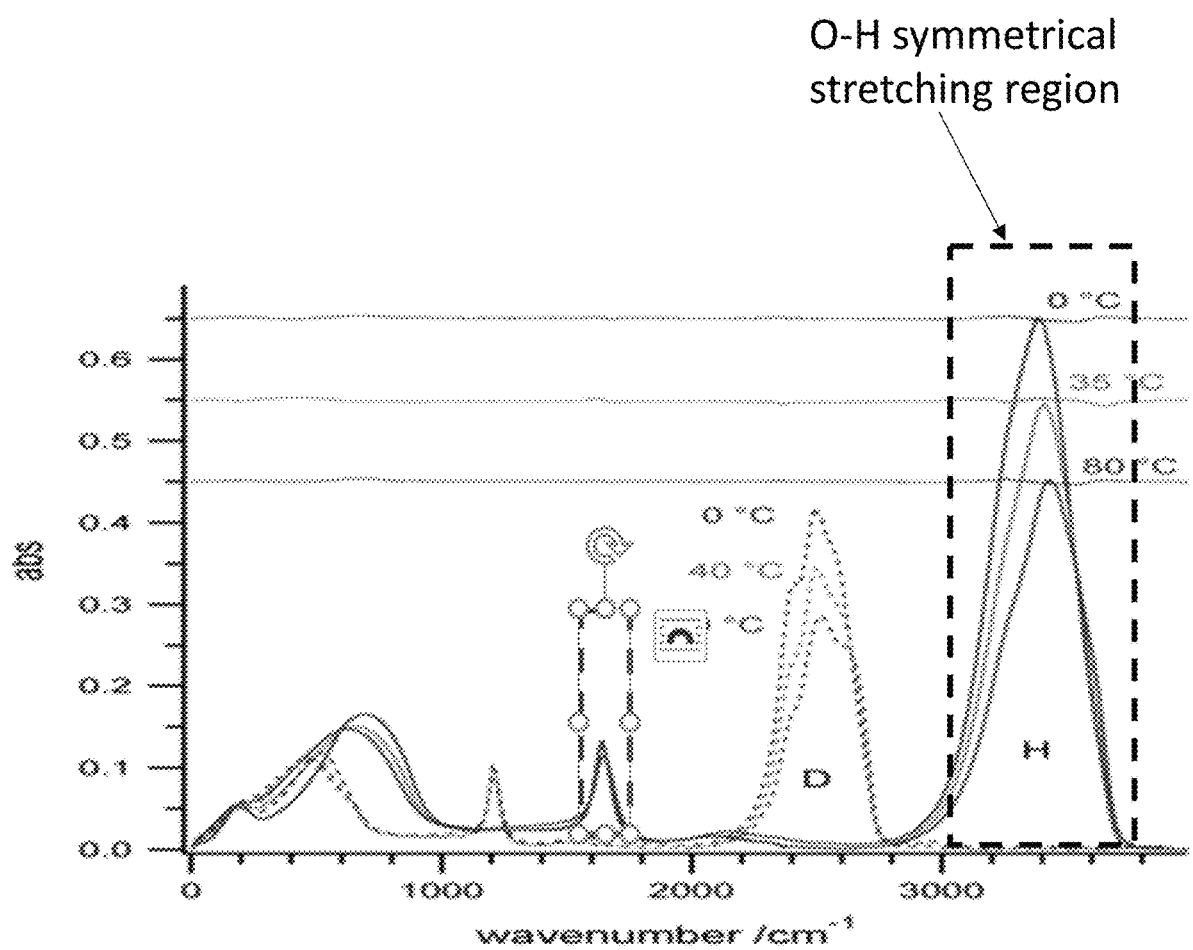
FIG. 11 shows water absorption spectra as a function of temperature.

FIG. 11 shows water spectra as a function of temperature. As taught in U.S. Pat. Nos. 9,625,378 and 10,190,969 (the disclosure of both of which are incorporated herein, in its entirety, by reference) rapidly switching between two fluids while collecting the spectrum minimizes the time for changes to occur in the spectrum due to temperature, optical effects, and 1/f noise from the light source. However, this technique does not address the dynamic range problem and requires at least 3 different neutral density filters to be swapped into the beam at various wavelengths using additional time, sample volume, and changing an optical element in the system all which can lead to further optical errors. The matched optical filter eliminates this problem.

Example 2: Lipids in Water

Measuring lipids in aqueous solution has important applications in biopharma. For example, LNP (lipid nanoparticles) are currently being used as delivery vessels for active ingredients of drug products. The lipids serve as a barrier that protects the drug (typically a protein) until it reaches a target cell. Lipids are made up of fatty acids which have various CH absorption bands in the 2800-3700 cm-1 region. The symmetrical stretching mode of water also overlaps this region which, similar to Amide I, makes precise measurements of solutions/suspensions difficult.

In this embodiment the matched optical filter is designed to be complementary to the OH symmetrical stretching absorption of water in the 3000-3700 cm-1 region.

TABLE 2

| Wavenumber (cm$^{-1}$) | Assignment |
| --- | --- |
| 3,7000-3,000 | $\nu_r$O—H of water, $\nu_r$N—H of amide, $\nu_r$C—O of carbohydrates |
| 3,006 | $\nu_r$C—H of C=CH— chains of lipids |
| 2,954 | $\nu_{as}$CH$_3$ of mehtyl groups |
| 2,926 | $\nu_{as}$CH$_2$ of methylene groups |
| 2,855 | $\nu_r$CH$_2$ and $\nu_r$CH$_3$ of methyl and methylene groups |
| 1,746 | $\nu_r$C=O ester of lipids and fatty acids |
| 1,655 | $\nu_r$C=O of proteins (Amide I) |

TABLE 2-continued

| Wavenumber (cm$^{-1}$) | Assignment |
|---|---|
| 1,548 | $\delta$N—H and $\gamma$C—N of protiens (Amide II) |
| 1,460 | $\delta_{as}$CH$_2$ and $\delta_{as}$CH$_3$ of methyl and methylene groups |
| 1,380 | $\delta$CH$_2$ and $\delta$CH$_3$ from proteins and $\delta$C—O from carboxylic groups |
| 1,230 | $\gamma_{as}$P=O from phosphodiester of nucleic acids and phospholipids |
| 1,200-900 | $\gamma$C—O—C from polysaccharides |
| 980 | P—O—P of Polyphosphates |

Band assignments are taken from references Giordano et al. (2001) and Mayers et al. (2013). $\gamma$, symmetric stretching; $\gamma_{as}$, asymmetrical stretching; $\delta$, symmetric deformation (bend); $\delta_{as}$, asymmetric deformation (bend).

Example 3: Fingerprint Region Bacterial/Viral identification

The fingerprint region of the infrared spectrum (typically considered 400-1200 cm-1) is very useful for identifying unknown analytes. Academic research has shown this region can be used to identify bacterial strains (1) however the water absorption spectrum overlaps a significant portion of the finger-print region making measuring aqueous solutions challenging.

Figure 12:
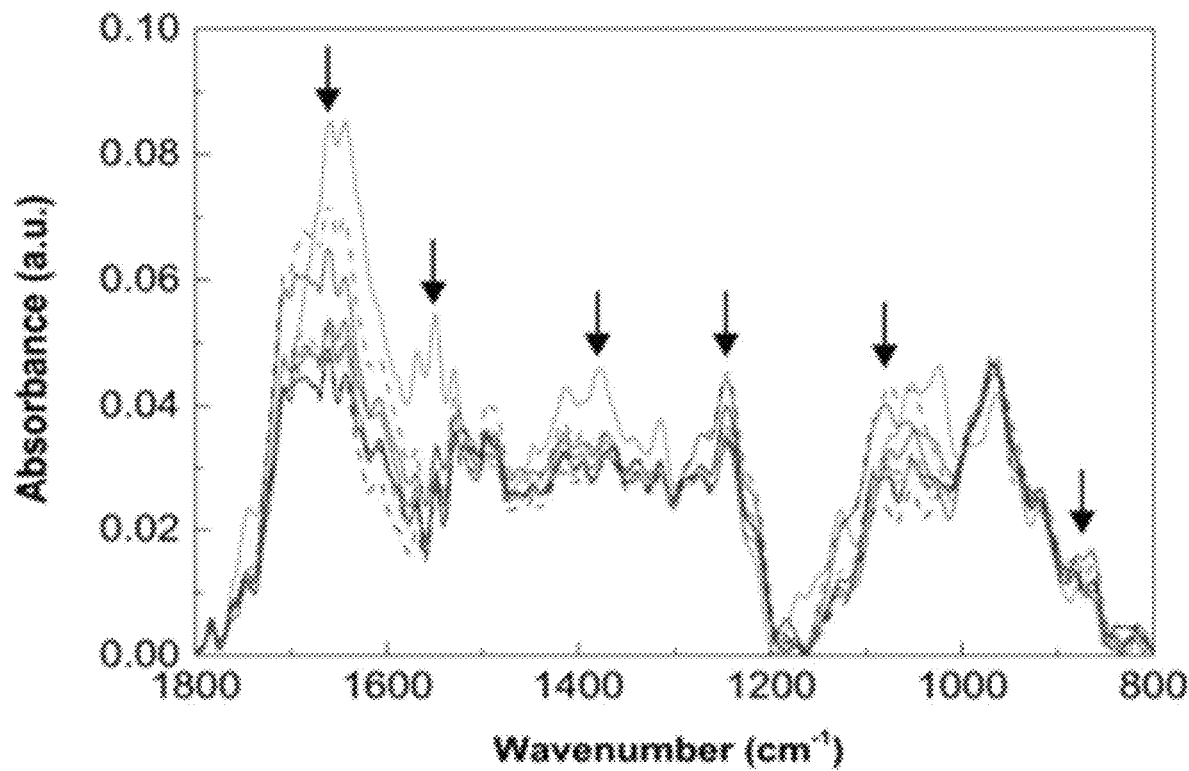
FIG. 12 shows spectra of bacterial genomic DNA as measured by the IR analysis system.

FIG. 12 shows spectra of bacterial genomic DNA as measured by the IR analysis system of the disclosed system. In this embodiment the matched optical filter is designed to be complementary to the absorption of water in the 400-1200 cm-1 region. Note that this region of the spectrum also suffers from changes in the water spectrum due to temperature so all of the benefits listed herein apply.

Figure 13:
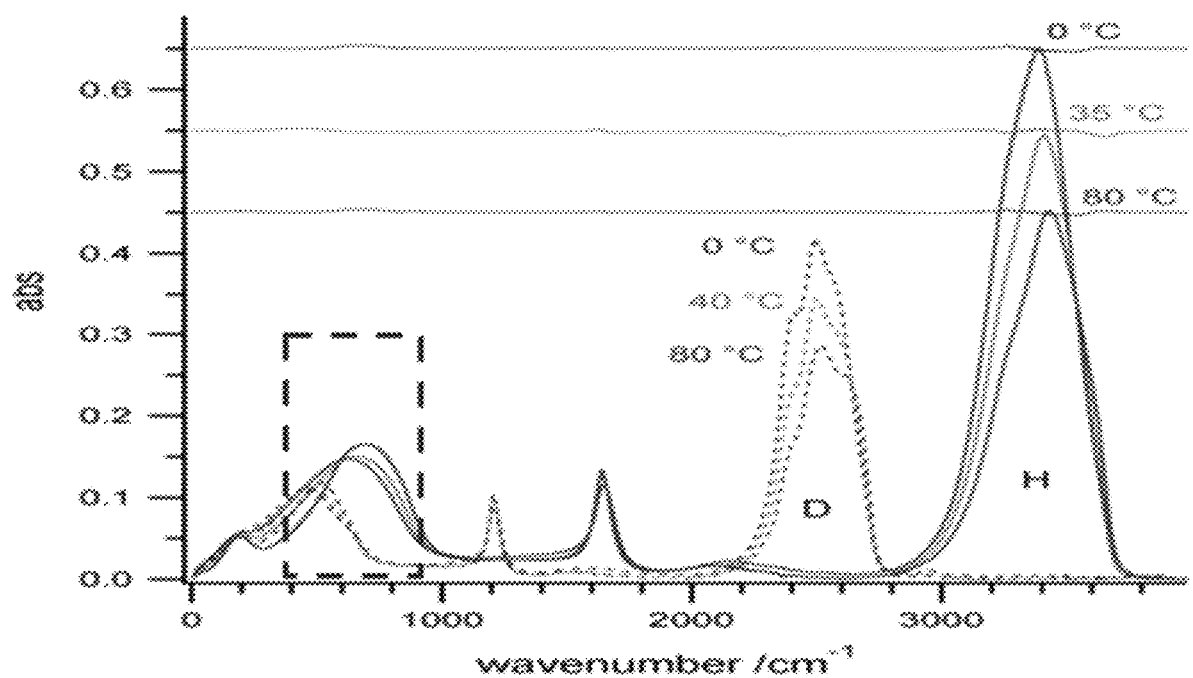
FIG. 13 shows FT-IR data.

FIG. 13 shows FT-IR data of the same bacterial solution as in FIG. 12. However, the fine structure of the sample is not apparent in the FT-IR spectra because the FT-IR system does not include a matched optical filter.

Example 4. Fingerprint Region Cell Culture Media

Similar to above, the same "fingerprint" region could be used to identify cell media components such as metabolites and cellular waste products. For example, lactate has characteristic absorbances in the fingerprint region which the strong water absorption overlaps and interferes with. This problem is pointed out in FIGS. 14 and 15 and illustrated here.

Figure 14:
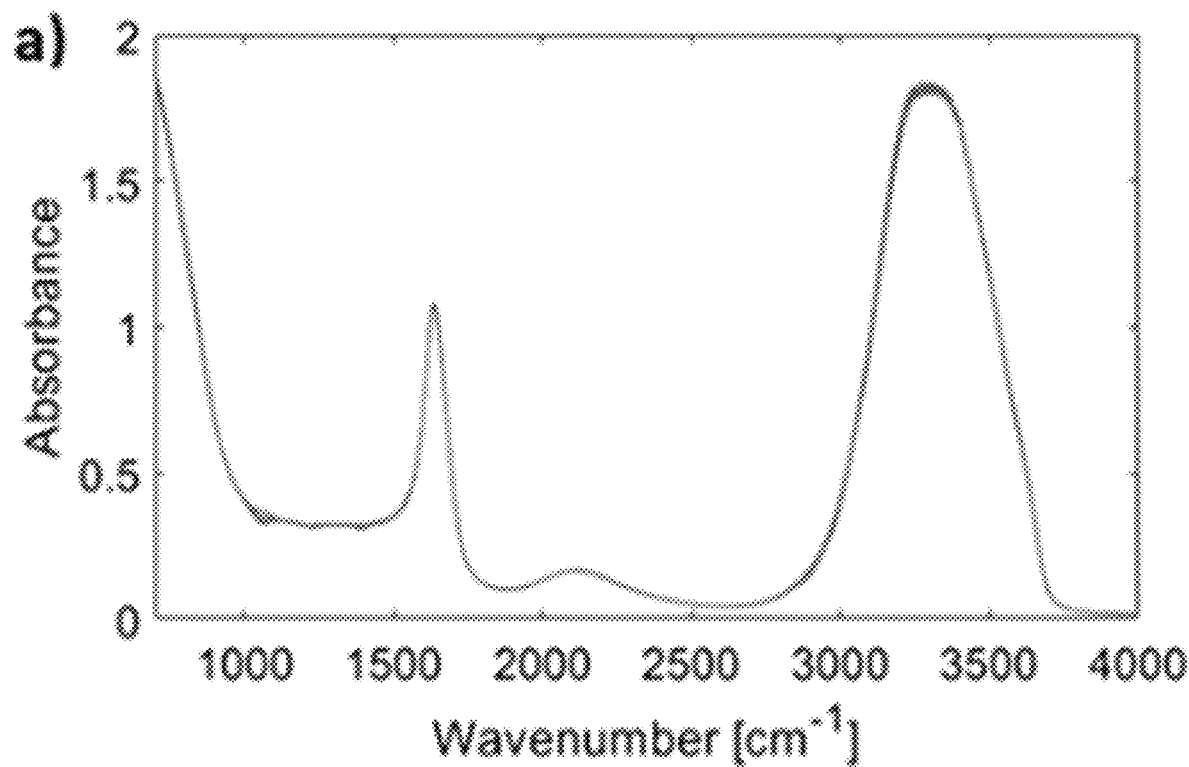
FIG. 14 shows spectra of lactate in water.
Figure 15:
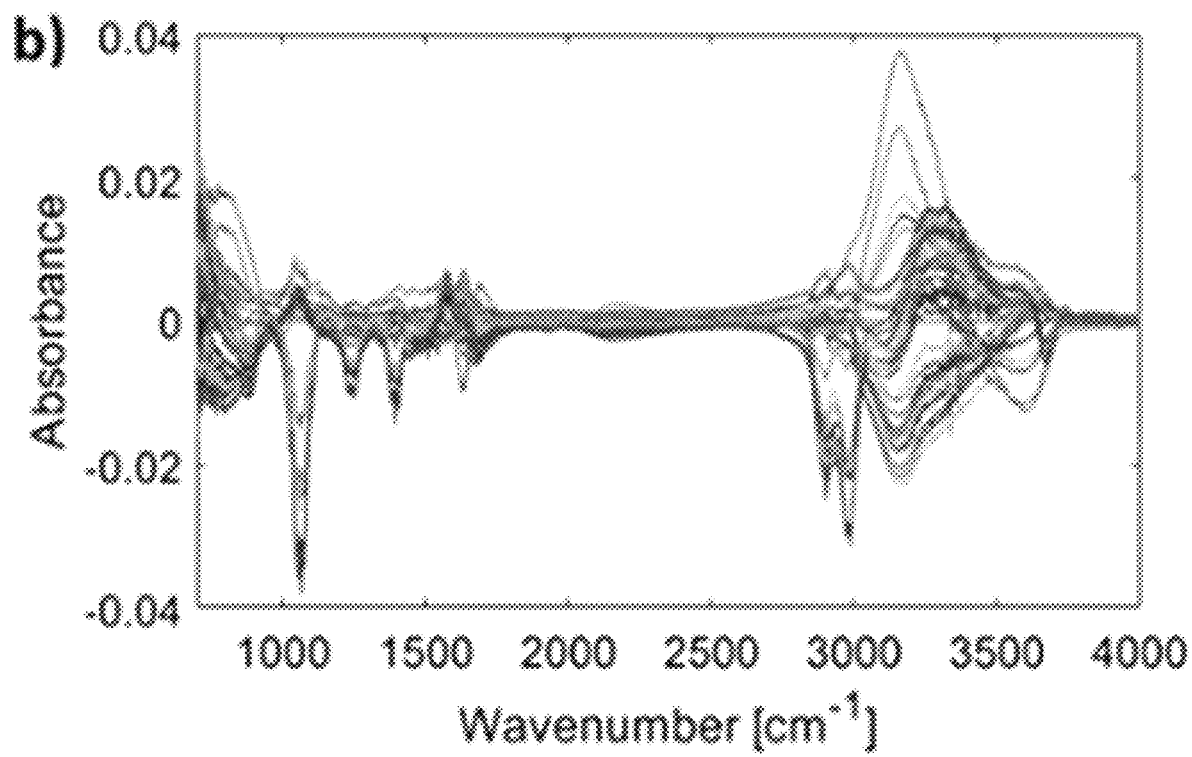
FIG. 15 shows a lactate spectra after water has been removed.

FIG. 14 shows spectra of lactate in water and the differences are hidden in the water absorption bands. It is not until the water baseline is subtracted off, as shown in FIG. 15, that the lactate becomes apparent. This interference of the water signal can be eliminated using a combination of microfluidic sample control and the matched optical filter allowing orders of magnitude more light to transmit within the usable range of the detector and thus improving the quality of the spectra.

Figure 16:
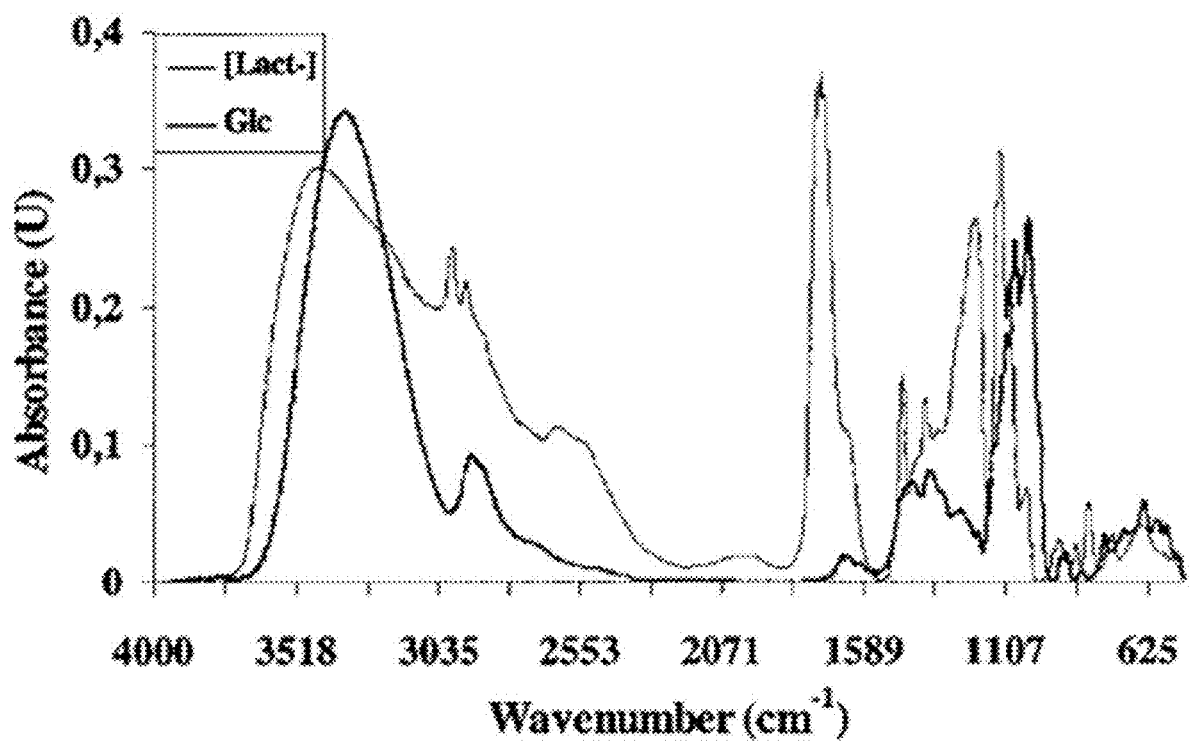
FIG. 16 compares the infrared spectrum of glucose and lactate.

FIG. 16 compares the infrared spectrum of glucose and lactate. Glucose is a common constituent of cell culture media used to feed cells and lactate is a well-known waste product excreted as from the cells. Discriminating these components could inform analytics in bioprocesses such as perfusion reactors when and at what rate to exchange the cell media.

It is important to note that the samples measured in FIG. 16 were dried to avoid the interference of water. This is not practical to do in a bioreactor so the combination of microfluidic sample control and the matched optical filter would be highly beneficial.

Example 5: Nucleic Acids in Water

Figure 17A:
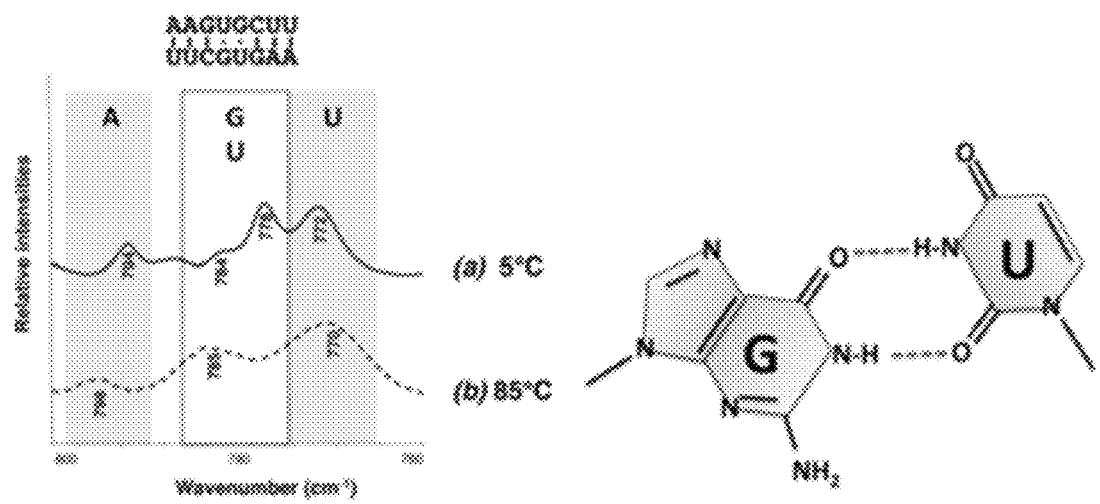
FIG. 17A shows FT-IR spectra recorded in a $D_2O$ solution.

FIG. 17A shows FT-IR spectra that was obtained in a D$_2$O solution. The 800-760 cm-1 region contains absorption bands due to the bases.

Nucleic acids share absorptions across the infrared spectrum with very informative peaks in the 700-1200 cm-1 region and 1580-1690 cm-1 region. These regions also overlap water absorption bands as shown previously and would benefit from a matched optical filter to reduce the necessary dynamic range. 10

Figure 17B:
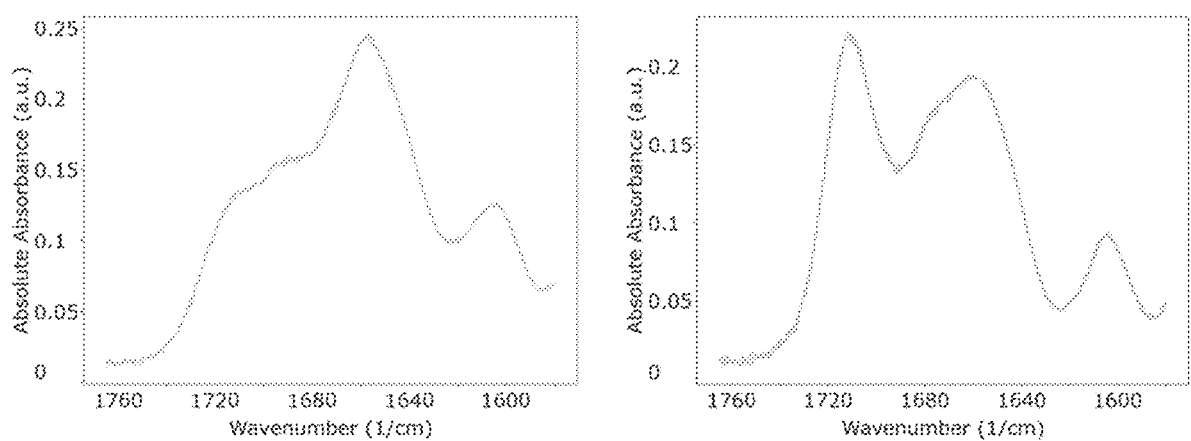
FIG. 17B shows two spectra collected on an embodiment of the disclosed system in the 1550-1760 cm-1 region.

FIG. 17B shows two spectra collected on an embodiment of the disclosed system in the 1550-1760 cm-1 region utilizing a matched optical filter. The spectra in FIG. 17B are of riboswitches, small strands of RNA, which are not bound to any proteins. Each of these two spectra are the combined spectra of several nucleosides in an RNA. These spectra show the sensitivity of the disclosed system to measure a liquid analyte with a weak absorbance in a prescribed reference solution with a very high absorbance.

TABLE 3

The wavenumbers and corresponding spectral assignment of infrared (IR) bands characteristic of nucleic acids in D20 or H2O* [14, 16, 11, 9, 12]. ss and ds stand for single stranded and double stranded, respectively

| Wavenumber (cm$^{-1}$) | Assignment |
|---|---|
| 1698-1691 | C2 = 02 of U in ss or ds |
| 1677-1672 | C4 = 04 of U in ds |
| 1658-1653 | C4 = 04 of U in ss |
| 1618-1615 | Ring of U in ss |
| 770 | Free U |
| 770 | A-base paired U |
| 772 | G-base paired U (G-U wobble) |
| 1689-1678 | C6 = 06 of U in ss or ds |
| 1673-1660 | C6 = 06 of U in ss or ds |
| 1590-1595 and 1568-1564 | Ring of G in ss or ds |
| 1350* and 1320* | G in syn conformation (GC* Hoogsteen base pair) |

TABLE 3-continued

The wavenumbers and corresponding spectral assignment of infrared
(IR) bands characteristic of nucleic acids in D2O or H2O* [14, 16, 11, 9, 12].
ss and ds stand for single stranded and double stranded, respectively

| Wavenumber (cm$^{-1}$) | Assignment |
|---|---|
| 785 | Free G |
| 781 | C-base paired G |
| 778 | U-base paired G (GU wobble) |
| 1655-1647 | C2 = O2 of C in ss or ds |
| 1624-1616, 1585-1582, 1527-1526, 1506-1498 | Ring of C in ss or ds |
| 787 | Free C |
| 784 | G-base paired C |
| 1626-1627 | ND$_2$ coupled to ring vibration of A (6-aminopurine) |
| 1632-1622 and 1579-1576 | Ring of A in ss or ds |
| 798 | Free A |
| 794 | T-base paired A |
| 1245-1235* | A form/antisymmetric PO2 stretching (partially hidden by D2O) |
| 1188-1175 | A form, sugar-phosphate backbone |
| 1225-1220* | B form/antisymmetric PO2 stretching (partially hidden by D2O) |
| 845-835 | Ribose S-type |
| 880-860 | Ribose N-type |

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method to measure a liquid analyte with a weak absorbance in a prescribed reference solution with a very high absorbance, comprising:
   alternatively flowing the liquid analyte and the prescribed reference solution through a fluid chamber in a liquid flow cell;
   emitting an IR light from an IR light source;
   using a matched optical filter spectroscopically matched to at least a component portion of the prescribed reference solution to filter the IR light from the IR light source to produce filtered light, the matched optical filter configured to filter at least a portion of the IR light from the IR light source to a substantially inverse manner to the absorbance of the prescribed reference solution;
   transmitting the filtered light through a sample cell in the fluid chamber to produce a chamber signal; and
   using a detector having an optical range to detect the chamber signal.

2. The method of claim 1, wherein the chamber signal comprises at least one of an analyte signal or a reference signal.

3. The method of claim 2, wherein the matched optical filter reduces the reference signal across a spectral region of interest to be maintained within a correctible linear range of the detector.

4. The method of claim 3, wherein the matched optical filter is spectroscopically matched to the spectral region of interest of at least one of:
   from between about 1600 cm-1 to about 1700 cm-1;
   from between about 1580 cm-1 to about 1720 cm-1;
   from between about 400 cm-1 to about 1200 cm-1; or
   from between about 3000 cm-1 to about 3700 cm-1.

5. The method of claim 4, wherein the detector is spectroscopically matched to the spectral region of interest from between about 1600 cm-1 to about 1700 cm-1, the spectral region of interest being an Amide I region.

6. The method of claim 5, wherein the controller provides automatic and continuous real-time background referencing.

7. The method of claim 1, wherein the IR light emitted from the IR light source comprises a coherent IR light from a tunable optical laser source.

8. The method of claim 7, wherein the tunable optical laser source comprises tunable optical quantum cascade laser (QCL) configured to operate in an IR region.

9. The method of claim 1, wherein the prescribed reference solution comprises a portion of at least one component, the at least one component comprising a reference fluid, a salt, and a buffer solution.

10. The method of claim 9, wherein the reference fluid component comprises at least one of a water, an alcohol, or an oil.

11. The method of claim 10, wherein the reference fluid component comprises water.

12. The method of claim 1, further comprising:
    providing a shutter, the shutter configured to be positioned in an optical beam path of the filtered light such that the filtered light is blocked from reaching the sample cell at predetermined intervals.

13. A system to measure a liquid analyte with a weak absorbance in a prescribed reference solution with a very high absorbance, the system comprising:
    a tunable optical laser source configured to emit coherent light across a range of wavelengths;
    a liquid flow cell having a sample chamber with a chamber window configured to alternatively receive the liquid analyte and the prescribed reference solution; and
    a matched optical filter spectroscopically matched to the prescribed reference solution, the matched optical filter configured to substantially flatten the very high absorbance of a prescribed reference solution signal across at least a portion of an optical spectrum, the portion of the coherent light from the tunable optical laser is filtered in a substantially inverse manner to the absorbance of the prescribed reference solution.

14. The system of claim 13, further comprising:
    a detector configured so that:
    the emitted coherent light is directed toward the matched optical filter so that the emitted coherent light is filtered to pass a filtered light;

the filtered light is directed to pass through the chamber window in the sample chamber where it interacts with either the liquid analyte to produce a liquid analyte spectrum or the prescribed reference solution to produce a prescribed reference solution spectrum; and the detector further configured to measure the liquid analyte spectrum or the reference solution spectrum.

15. The system of claim 14, further comprising:
a controller in electrical communication with the system that:
fully automates the alternatively receiving the liquid analyte and the reference solution; and
fully automates measurement of the liquid analyte spectrum and the reference solution spectrum.

16. The system of claim 14, wherein:
the system measures an infra-red (IR) absorbance spectrum of the liquid analyte; and
the system measures an infra-red (IR) absorbance spectrum of the prescribed reference solution.

17. The system of claim 16, wherein a ratio of the infra-red (IR) absorbance spectrum of the liquid analyte to the infra-red (IR) absorbance spectrum of the prescribed reference solution is performed to produce a differential absorbance signal.

18. The system of claim 13, wherein the matched optical filter is positioned in an optical path between a laser window and a detector window.

19. The system of claim 18, wherein the matched optical filter is positioned in the optical path before the chamber window.

20. The system of claim 13, wherein the matched optical filter is combined with one or more of a chamber window, a laser window, or a mirror.

21. The system of claim 13, wherein the matched optical filter comprises:
a substrate; and
a plurality of layers deposited on the substrate that form an interference filter.

22. The system of claim 21, wherein the substrate comprises at least one of a germanium (Ge) window; a calcium fluoride ($CaF_2$) window; a barium fluoride ($BaF_2$) window; a zinc selenide (ZnSe) window; a chalcogenide window; or a silicon (Si) window.

23. The system of claim 22, wherein the substrate comprises germanium (Ge).

24. The system of claim 21, wherein the matched optical filter comprises an anti-reflection (AR) coating grown on a side of the substrate that is opposite of the side having the plurality of layers.

25. The system of claim 21, wherein the substrate has a wedged shape to reduce interference effects when used in transmission.

26. The system of claim 13, wherein the prescribed reference solution comprises a liquid water layer having a thickness of between about 22+/−um and about 27+/−um.

27. The system of claim 13, wherein the matched optical filter is adjusted to compensate for differences in laser gain across the spectral region of interest.

28. The system of claim 13, wherein the matched optical filter is configured to provide compensation that is between the reference fluid and the sample fluid.

29. The system of claim 13, wherein the liquid analyte comprises at least one of a protein, a nucleic acid, a lipid-like substance, or a virus.

30. The system of claim 13, wherein the tunable optical laser source comprises a quantum cascade laser (QCL).

31. The system of claim 30, wherein the QCL:
emits a coherent light in a wavenumber range between 1580 cm-1 to 1720 cm-1;
operates with a resolution of 1 cm-1;
operates within an analyte concentration range of between about 0.1 mg/mL to 200 mg/mL; and
operates with a high power output, the high power output being between about 5 mW and 200 mW.

32. The system of claim 13, wherein the alternately receiving of the liquid analyte and the prescribed reference solution in the sample chamber occurs at a rate of between about 0.1 cycles per second and 50 cycles per second without moving the sample cell.

33. A matched optical filter for use with a prescribed reference solution, the optical filter comprising:
a substrate; and
a plurality of layers on the substrate that form an optical filter spectroscopically matched to the prescribed reference solution, the matched optical filter configured to compensate for a very high absorbance of a reference solution signal across a portion of an optical spectrum, the matched optical filter configured to filter at least a portion of coherent light from a tunable optical laser to a substantially inverse manner to the absorbance of the prescribed reference solution.

34. The matched optical filter of claim 33, wherein the matched optical filter flattens out an optical power of a liquid water layer absorption spectrum measured by a detector after the filtered light passes through a liquid water layer having a thickness of between about 10 um and about 100 um.

35. The matched optical filter of claim 34, wherein the matched optical filter comprises an anti-reflection (AR) coating grown on a side of the substrate that is opposite the side having the plurality of layers.

36. The matched optical filter of claim 34, wherein the matched optical filter flattens out an optical power of a liquid water layer absorption spectrum measured by a detector after the filtered light passes through a liquid water layer having a thickness of between about 22+/−um and about 27+/−um.

37. The matched optical filter of claim 33, wherein the substrate comprises at least one of a germanium (Ge) window; a calcium fluoride ($CaF_2$) window; a barium fluoride ($BaF_2$) window; a zinc selenide (ZnSe) window; a chalcogenide window; or a silicon (Si) window.

38. The matched optical filter of claim 33, wherein the substrate comprises germanium (Ge).

39. The matched optical filter of claim 33, wherein the matched optical filter comprises a tailored bandpass filter.

40. The matched optical filter of claim 33, wherein the matched optical filter comprises a coated mirror.

* * * * *